US010027628B2

(12) United States Patent
Call

(10) Patent No.: US 10,027,628 B2
(45) Date of Patent: *Jul. 17, 2018

(54) CLIENT/SERVER SECURITY BY AN INTERMEDIARY RENDERING MODIFIED IN-MEMORY OBJECTS

(71) Applicant: Shape Security, Inc., Mountain View, CA (US)

(72) Inventor: Justin Call, Santa Clara, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,019

(22) Filed: Oct. 30, 2015

(65) Prior Publication Data

US 2016/0057111 A1 Feb. 25, 2016

Related U.S. Application Data

(63) Continuation of application No. 14/099,437, filed on Dec. 6, 2013, now Pat. No. 9,270,647.

(51) Int. Cl.
*G06F 21/00* (2013.01)
*H04L 29/06* (2006.01)
(Continued)

(52) U.S. Cl.
CPC .......... *H04L 63/04* (2013.01); *G06F 9/45529* (2013.01); *H04L 29/06972* (2013.01);
(Continued)

(58) Field of Classification Search
CPC . H04L 63/04; H04L 63/1466; H04L 63/0281; H04L 29/06972; H04L 67/42; G06F 9/45529
See application file for complete search history.

(56) References Cited

U.S. PATENT DOCUMENTS 5,003,596 A   3/1991 Wood
5,315,657 A   5/1994 Abadi et al.
(Continued)

FOREIGN PATENT DOCUMENTS

CN   101471818 A   7/2009
CN   101471818     5/2011
(Continued)

OTHER PUBLICATIONS

David Goltzsche, Colin Wulf, Divya Muthukumaran, Konrad Rieck, Peter Pietzuch, Rüdiger Kapitza; "TrustJS: Trusted Client-side Execution of JavaScript"; Apr. 2017; EuroSec'17: Proceedings of the 10th European Workshop on Systems Security; Publisher: ACM; pp. 1-6.*

(Continued)

*Primary Examiner* — Michael S McNally
*Assistant Examiner* — Courtney Fields
(74) *Attorney, Agent, or Firm* — Hickman Palermo Becker Bingham LLP

(57) ABSTRACT

In an embodiment, a method comprises intercepting, from a server computer, a first set of instructions that define one or more objects and one or more operations that are based, at least in part, on the one or more objects; generating, in memory, one or more data structures that correspond to the one or more objects; performing the one or more operations on the one or more data structures; updating the one or more data structures, in response to performing the one or more operations, to produce one or more updated data structures; rendering a second set of instructions, which when executed by a remote client computer cause the remote client computer to generate the updated data structures in memory on the remote client computer, wherein the second set of instructions are different than the first set of instructions;

(Continued)

sending the second set of instructions to the remote client computer.

26 Claims, 9 Drawing Sheets

(51) Int. Cl.
    *G06F 9/455*         (2018.01)
    *H04L 12/22*         (2006.01)
    *G06F 21/34*         (2013.01)

(52) U.S. Cl.
    CPC ...... *H04L 63/0281* (2013.01); *H04L 63/1466* (2013.01); *H04L 67/42* (2013.01)

(56) References Cited

U.S. PATENT DOCUMENTS

| | | |
|---|---|---|
| 5,870,769 A | 2/1999 | Freund |
| 5,987,611 A | 11/1999 | Freund |
| 6,006,328 A | 12/1999 | Drake |
| 6,170,020 B1 | 1/2001 | Blakeney |
| 6,275,789 B1 | 8/2001 | Moser |
| 6,401,077 B1 | 6/2002 | Godden |
| 6,938,170 B1 | 8/2005 | Kraft |
| 6,957,229 B1 | 10/2005 | Dyor |
| 7,103,180 B1 | 9/2006 | McGregor |
| 7,117,429 B2 | 10/2006 | Vedullapalli et al. |
| 7,180,895 B2 | 2/2007 | Smith |
| 7,225,737 B2 | 6/2007 | Gelbart |
| 7,464,326 B2 | 12/2008 | Kawai et al. |
| 7,480,385 B2 | 1/2009 | Weber |
| 7,500,099 B1 | 3/2009 | McElwee et al. |
| 7,580,521 B1 | 8/2009 | Spies et al. |
| 7,705,829 B1 | 4/2010 | Plotnikov |
| 7,707,223 B2 | 4/2010 | Zubenko |
| 7,895,653 B2 | 2/2011 | Calo et al. |
| 7,940,657 B2 | 5/2011 | Perreault |
| 7,961,879 B1 | 6/2011 | Spies et al. |
| 7,975,308 B1 | 7/2011 | Satish et al. |
| 8,020,193 B2 | 9/2011 | Bhola et al. |
| 8,077,861 B2 | 12/2011 | Damgaard et al. |
| 8,086,756 B2 | 12/2011 | Kamyshenko et al. |
| 8,086,957 B2 | 12/2011 | Bauchot et al. |
| 8,170,020 B2 | 5/2012 | Oliver et al. |
| 8,225,401 B2 | 7/2012 | Sobel et al. |
| 8,266,202 B1 | 9/2012 | Colton et al. |
| 8,266,243 B1 | 9/2012 | Carlson et al. |
| 8,332,952 B2 | 12/2012 | Zhang et al. |
| 8,347,396 B2 | 1/2013 | Grigsby et al. |
| 8,392,576 B1 | 3/2013 | Henderson |
| 8,516,080 B2 | 8/2013 | Chow |
| 8,527,774 B2 | 9/2013 | Fallows et al. |
| 8,533,480 B2 | 9/2013 | Pravetz et al. |
| 8,548,998 B2 | 10/2013 | Plotnik |
| 8,555,385 B1 | 10/2013 | Bhatkar et al. |
| 8,555,388 B1 | 10/2013 | Wang et al. |
| 8,584,233 B1 | 11/2013 | Yang et al. |
| 8,601,064 B1 | 12/2013 | Liao |
| 8,621,197 B2 | 12/2013 | Suryanarayana et al. |
| 8,627,479 B2 | 1/2014 | Wittenstein et al. |
| 8,676,273 B1 | 3/2014 | Fujisaki |
| 8,689,330 B2 | 4/2014 | Sinn et al. |
| 8,762,705 B2 | 6/2014 | He |
| 8,806,627 B1 | 8/2014 | Aharoni |
| 8,869,281 B2 | 10/2014 | Call |
| 8,892,687 B1 | 11/2014 | Call |
| 8,904,279 B1 | 12/2014 | Bougon |
| 8,954,583 B1 | 2/2015 | Zhou |
| 9,075,990 B1 | 7/2015 | Yang |
| 9,225,729 B1 | 12/2015 | Moen |
| 9,241,004 B1 | 1/2016 | April |
| 9,275,222 B2 | 3/2016 | Yang |
| 9,294,502 B1 | 3/2016 | Benishti |
| 9,356,954 B2 | 5/2016 | Zhou |
| 9,609,006 B2 | 3/2017 | Call |
| 2002/0016918 A1 | 2/2002 | Tucker |
| 2002/0188631 A1 | 12/2002 | Tiemann et al. |
| 2003/0005129 A1 | 1/2003 | Scheinkman |
| 2003/0159063 A1 | 8/2003 | Apfelbaum et al. |
| 2004/0101142 A1 | 5/2004 | Nasypny |
| 2004/0162994 A1 | 8/2004 | Cohen |
| 2004/0230889 A1 | 11/2004 | Ishiyama |
| 2004/0245525 A1 | 12/2004 | Yamazaki |
| 2004/0249938 A1 | 12/2004 | Bunch |
| 2006/0015941 A1 | 1/2006 | McKenna |
| 2006/0031855 A1 | 2/2006 | Smithline |
| 2006/0034455 A1 | 2/2006 | Damgaard et al. |
| 2006/0053295 A1 | 3/2006 | Madhusudan et al. |
| 2006/0075260 A1 | 4/2006 | Tucker |
| 2006/0156278 A1 | 7/2006 | Reager |
| 2006/0195588 A1 | 8/2006 | Pennington et al. |
| 2006/0212932 A1 | 9/2006 | Patrick |
| 2007/0011295 A1 | 1/2007 | Hansen |
| 2007/0064617 A1 | 3/2007 | Reves |
| 2007/0074227 A1 | 3/2007 | Naidu |
| 2007/0245027 A1 | 10/2007 | Ghosh |
| 2008/0025496 A1 | 1/2008 | Smith et al. |
| 2008/0222736 A1 | 9/2008 | Boodaei et al. |
| 2008/0229394 A1 | 9/2008 | Stering et al. |
| 2008/0244078 A1 | 10/2008 | Viljuen et al. |
| 2008/0250310 A1 | 10/2008 | Chen |
| 2008/0320567 A1 | 12/2008 | Shulman |
| 2008/0320586 A1 | 12/2008 | Hrabik et al. |
| 2009/0007243 A1 | 1/2009 | Boodaei et al. |
| 2009/0099988 A1 | 4/2009 | Stokes et al. |
| 2009/0193497 A1 | 7/2009 | Kikuchi |
| 2009/0193513 A1 | 7/2009 | Agarwal et al. |
| 2009/0216882 A1 | 8/2009 | Britton |
| 2009/0241174 A1 | 9/2009 | Rajan et al. |
| 2009/0254572 A1 | 10/2009 | Redlich et al. |
| 2009/0282062 A1 | 11/2009 | Husic |
| 2009/0292984 A1 | 11/2009 | Bauchot et al. |
| 2010/0083072 A1 | 1/2010 | Prasad et al. |
| 2010/0037150 A1 | 2/2010 | Sawant |
| 2010/0100927 A1 | 4/2010 | Bhola et al. |
| 2010/0115594 A1 | 5/2010 | Paya et al. |
| 2010/0125612 A1 | 5/2010 | Amradkar et al. |
| 2010/0131512 A1 | 5/2010 | Ben-Natan |
| 2010/0172494 A1 | 7/2010 | Henson et al. |
| 2010/0180346 A1 | 7/2010 | Nicolson |
| 2010/0186089 A1 | 7/2010 | Fu et al. |
| 2010/0235637 A1 | 9/2010 | Lu et al. |
| 2010/0235910 A1 | 9/2010 | Ku et al. |
| 2010/0240449 A1 | 9/2010 | Corem |
| 2010/0257354 A1 | 10/2010 | Johnston et al. |
| 2010/0262780 A1 | 10/2010 | Mahan et al. |
| 2011/0015917 A1 | 1/2011 | Wang et al. |
| 2011/0022846 A1 | 1/2011 | Ginter |
| 2011/0047169 A1 | 2/2011 | Leighton et al. |
| 2011/0107077 A1 | 5/2011 | Henderson et al. |
| 2011/0129089 A1 | 6/2011 | Kim et al. |
| 2011/0131416 A1 | 6/2011 | Schneider |
| 2011/0154021 A1 | 6/2011 | McCann et al. |
| 2011/0154473 A1* | 6/2011 | Anderson ............... G06F 21/64 726/11 |
| 2011/0178973 A1 | 7/2011 | Lopez et al. |
| 2011/0225234 A1 | 9/2011 | Amit |
| 2011/0239113 A1 | 9/2011 | Hung et al. |
| 2011/0255689 A1 | 10/2011 | Bolotov et al. |
| 2011/0283110 A1 | 11/2011 | Dapkus et al. |
| 2011/0296391 A1 | 12/2011 | Gass et al. |
| 2011/0302623 A1 | 12/2011 | Ricci |
| 2011/0320816 A1 | 12/2011 | Yao et al. |
| 2012/0011262 A1 | 1/2012 | Cheng et al. |
| 2012/0022942 A1 | 1/2012 | Holloway |
| 2012/0023394 A1 | 1/2012 | Pieczul et al. |
| 2012/0030248 A1 | 2/2012 | Blinnikka |
| 2012/0059742 A1 | 3/2012 | Katzin et al. |
| 2012/0096116 A1 | 4/2012 | Mislove et al. |
| 2012/0117649 A1 | 5/2012 | Holloway et al. |
| 2012/0124372 A1 | 5/2012 | Dilley et al. |
| 2012/0173699 A1 | 7/2012 | Niemela |
| 2012/0173870 A1 | 7/2012 | Reddy et al. |

(56) References Cited

U.S. PATENT DOCUMENTS

| | | | |
|---|---|---|---|
| 2012/0174225 A1 | 7/2012 | Shyamsunder | |
| 2012/0180021 A1 | 7/2012 | Byrd et al. | |
| 2012/0198528 A1 | 8/2012 | Baumhof | |
| 2012/0216251 A1 | 8/2012 | Kumar et al. | |
| 2012/0254845 A1 | 10/2012 | Yi | |
| 2012/0255006 A1 | 10/2012 | Aly | |
| 2013/0031037 A1 | 1/2013 | Brandt | |
| 2013/0041986 A1 | 2/2013 | Colton et al. | |
| 2013/0091582 A1 | 4/2013 | Chen et al. | |
| 2013/0198607 A1 | 8/2013 | Mischook et al. | |
| 2013/0219256 A1 | 8/2013 | Lloyd et al. | |
| 2013/0219492 A1 | 8/2013 | Call et al. | |
| 2013/0227397 A1* | 8/2013 | Tvorun | G06F 17/227 715/235 |
| 2013/0232234 A1 | 9/2013 | Kapur et al. | |
| 2013/0232578 A1 | 9/2013 | Chevallier-Mame | |
| 2013/0263264 A1 | 10/2013 | Klein et al. | |
| 2013/0340043 A1 | 12/2013 | Zarei et al. | |
| 2014/0040787 A1 | 2/2014 | Mills | |
| 2014/0053059 A1* | 2/2014 | Weber | G06F 9/45529 715/234 |
| 2014/0089786 A1 | 3/2014 | Hashmi | |
| 2014/0165197 A1 | 6/2014 | Ur et al. | |
| 2014/0189499 A1 | 7/2014 | Gigliotti | |
| 2014/0223290 A1 | 8/2014 | Hathaway | |
| 2014/0282872 A1 | 9/2014 | Hansen et al. | |
| 2014/0283069 A1 | 9/2014 | Call et al. | |
| 2014/0289830 A1 | 9/2014 | Lemaster | |
| 2014/0359571 A1 | 12/2014 | Sasikumar et al. | |
| 2014/0379902 A1 | 12/2014 | Wan | |
| 2015/0039962 A1 | 2/2015 | Fonseka et al. | |
| 2015/0067853 A1 | 3/2015 | Amrutkar | |
| 2015/0163201 A1 | 6/2015 | Call | |
| 2015/0341385 A1 | 11/2015 | Sivan | |
| 2016/0028760 A1 | 1/2016 | Yang et al. | |
| 2016/0080515 A1 | 3/2016 | Kruglick | |
| 2016/0142438 A1 | 5/2016 | Pastore | |
| 2016/0149953 A1 | 5/2016 | Hidayat et al. | |
| 2016/0182537 A1 | 6/2016 | Tatourian | |
| 2017/0063923 A1 | 3/2017 | Yang | |
| 2017/0118241 A1 | 4/2017 | Call | |
| 2017/0201540 A1 | 7/2017 | Call | |

FOREIGN PATENT DOCUMENTS

| | | | | |
|---|---|---|---|---|
| GB | 2443093 A | 4/2008 | | |
| WO | WO9964967 A1 | 12/1999 | | |
| WO | WO00/72119 A2 | 11/2000 | | |
| WO | WO02/093369 A1 | 11/2002 | | |
| WO | WO02088951 A1 | 11/2002 | | |
| WO | WO2004109532 A1 | 12/2004 | | |
| WO | WO2008095018 A2 | 8/2008 | | |
| WO | WO2008095031 A1 | 8/2008 | | |
| WO | WO2008130946 A2 | 10/2008 | | |
| WO | WO2010046314 A1 | 4/2010 | | |
| WO | WO2013091709 A1 | 6/2013 | | |
| WO | WO 2014078441 A2 * | 5/2014 | | H01L 63/1416 |
| WO | 2017/040453 | 3/2017 | | |
| WO | PCT/US2016/049357 | 3/2018 | | |

OTHER PUBLICATIONS

International Searching Authority, "Search Report" in application No. PCT/US2015/049024, dated Jan. 19, 2016, 10 pages.
Claims in application No. PCT/US2015/049024, dated Jan. 2016, 8 pages.
Davido et al., "Understanding Split and Join", PerlMonks, http://www.perlmonks.org/?node_id=591988, dated Dec. 28, 2006, 10 pages.
W3Schools.com. "Javascript Timing Events", dated Dec. 31, 2013, accessed online, http://web.archive.org/web/20131231074905/http://w3schools.com/js/js_timing.asp, 30 pages.
The International Bureau of WIPO, "International Preliminary Report on Patentability" in application No. PCT/US2014/068133, dated Jun. 21, 2016, 12 pages. Claims in application No. PCT/US2014/068133, dated Jun. 2016, 16 pages.
Entrust, "Defeating Man-in-the-Browser Malware," Entrust.com [online] Sep. 2012 [retrieved Oct. 15, 2013]. Retrieved from the Internet: <URL:http://download.entrust.com/resources/download.cfm/24002/>. 18 pages.
Anderson et al., "Measuring the Cost of Cybercrime," 2012 Workshop on the Economics of Information Security (WEIS), [retrieved on Oct. 15, 2013], Retrieved from the Internet: <URL: http://web.archive.org/web/20130623080604/http://weis2012.econinfosec.org/papers/Anderson_WEIS2012.pdf>, 31 pages , Jun. 2012.
International Searching Authority. "Search Report" in application No. PCT/2014/027805, dated Aug. 14, 2014, 14 pages.
International Searching Authority, "Search Report" in application No. PCT/2014/023897, dated Jul. 18, 2014, 15 pages.
H Krawczyk, "HMAC-Based Extract-And-ExpandKeyDerivationFunction,(HKDF)", RFC 5869,IETF, May 2010,10pages.
Google Search, "Google Patents Search Results" dated May 21, 2014, 2 pages.
European Patent Office, "search report" in application No. PCT/US2015/031361, dated Jul. 28, 2015, 13 pages.
European Patent Office, "Search Report" in application No. PCT/US2014/068133, dated Apr. 7, 2015, 14 pages.
International Searching Authority, "Search Report" in application No. PCT/US2014/024232, dated Aug. 1, 2014. 52 pages.
European Patent Office in application No. PCT/US2014/068133, dated Apr. 7, 2015, 14 pages.
IP.com "Search Results", Patents and Applications. http://ip/com/search/results.html, dated May 6, 2014, 2 pages.
Egele et al., "Defending Browsers against Drive-by Downloads: Mitigating Heap-spraying Code Injection Attacks," Detection of Intrusions and Malware, and Vulnerability Assessment Lecture Notes in Computer Science, 5587:88-106. Retrieved from the Internet: <URL: http://anubis.seclab.tuwien.ac.at/papers/driveby.pdf>, 19 pages, 2009.
Dougan et al., International Journal of Ambient Computing and Intelligence, dated Jan.-Mar. 2012, pp. 29-39.
D Kristol, "HTTP State Management Mechanism", RFC 2965, IETF, dated Oct. 2000, 19 pages.
Currie et al., "In-the-wire authentication: Protecting client-side critical data fields in secure network transactions," 2nd International Conference on Adaptive Science and Technology, 2009, pp. 232-237.
Cova et al., "Detection and Analysis of Drive-by-Download Attacks and Malicious JavaScript Code," World Wide Web Conference Committee, Apr. 26-30, 2010. Retrieved from the Internet: <URL: http://www.cs.ucsb.edu/~vigna/publications/2010_cova_kruegel_vigna_Wepawet.pdf>, 10 pages.
CodeSealer, "CodeSealer," codesealer.com [online] 2013 [captured Aug. 29, 2013]. Retrieved from the Internet: <URL:http://web.archive.org/web/20130829165031/http://codesealer.com/technology.html>, 2 pages.
Claims in European Application No. PCT/US2014/068133, dated Apr. 2015, 16 pages.
European Patent Office, "Search Report" in application No. PCT/US2014/023635, dated Jan. 21, 2015, 11 pages.
RSA, "RSA Offers Advanced Solutions to Help Combat Man-In-The-Browser Attacks," rsa.com [online] May 18, 2010 [captured Nov. 11, 2011]. Retrieved from the Internet: <URL: http://web.archive.org/web/20111111123108/http://rsa.com/press_release.aspx?id=10943>, 3 pages.
USPTO, Office Action in U.S. Appl. No. 14/286,733, dated Jul. 14, 2014, 17 pages.
Trusterr, "Trusteer Rapport", "Endpoint-centric Fraud Prevention", from the web http://www.trusteer.com/products/trusterr-rapport, last accessed on Jan. 9, 2013. 2 pages.
Team Cymru, "Cybercrime—an Epidemic," Queue, 4(9):24-35, Nov. 2006, Retrieved from the Internet: <URL: http://trygstad.rice.iit.edu:8000/Articles/Cybercrime%20%20An%20Epidemic%20-%20ACM%20Queue.pdf>, 3 pages.

(56) References Cited

OTHER PUBLICATIONS

Sood et al., "The Art of Stealing Banking Information—Form grabbing on Fire." Virus Bulletin, Nov. 2011, Retrieved from the Internet: <URL: http://www.virusbtn.com/virusbulletin/archive/2011/11/vb201111-form-grabbing>, "(pp. 19-23 of 24 pages)".
Sood and Enbody, "Browser Exploit Packs—Exploitation Tactics," Virus Bulletin Conference, Oct. 2011, Retrieved from the Internet: <URL:http://www.secniche.org/papers/VB_2011_BRW_EXP_PACKS_AKS_RJE.pdf>, 9 pages.
Sood and Enbody. "A Browser Malware Taxonomy," Virus Bulletin, Jun. 2011. Retrieved from the Internet: <URL:http://www.secniche.org/released/VB_BRW_MAL_TAX_AKS_RJ E.pdf>, 6 pages.
Sedaghat et al., "On-the-Fly Web Content Integrity Check Boots Users Confidence", dated Nov. 2002. Communication of the ACM, vol. 45 Issue 11. Publisher, ACM, pp. 33-37.
International Searching Authority, "Search Report" in Application No. PCT/US15/12072, dated Jan. 20, 2015, 14 pages.
Rutkowska, "Rootkits vs. Stealth by Design Malware," Black Hat Europe, 2006. Retrieved from the Internet: <URL:http://www.blackhat.com/presentations/bh-europe-06/bh-eu-06-Rutkowska.pdf> 44 pages.
Vasco, "Hardened Browser," vasco.com [online] [retrieved on Oct. 15, 2013]. Retrieved from the Internet: <URL: http://www.vasea.com/products/client_products/pki_digipass/hardened_browser.aspx>, 2 pages.
Rieck et al., "Cujo: Efficient Detection and Prevention of Drive-by-Download Attacks", ACSAC, Dated Dec. 2010, 9 pages.
Pattabiraman et al., "DoDOM: Leveraging DOM Invariants for Web 2.0 Application Robustness Testing" dated 2010, IEEE, 10 pages.
Oh, "Recent Java exploitation trends and malware," Black Hat USA 2012, Retrieved from the Internet: <URL: https://media.blackhat.com/bh-us-12/Briefings/Oh/BH_US_12_Oh_Recent_Java_Exploitation_Trends_and_Malware_WP.pdf>, 27 pages.
Matsunaka et al., "Detecting and Preventing Drive-By Download Attack via Participative Monitoring of the Web", Information Security, dated Jul. 26, 2013, 8th Asia Joint Conference, pp. 48-55.
Marcus and Sherstobitoff, "Dissecting Operation High Roller," McAfee [online] 2012 [retrieved on Oct. 15, 2013]. Retrieved from the Internet: <URL: http://www.mcafee.com/us/resources/reports/rp-operation-high-roller.pdf>, 20 pgs.
Li et al., "WebShield: Enabling Various Web Defense Techniques Without Client Side Modifications", dated Aug. 15, 2009, 18 pages.
Krebs on Security, In-depth security news and investigation, "A Closer Look at Rapport from Trusteer", dated Apr. 29, 2010, http://krebsonsecurity.com/2010/04/a-closer-look-atrapport-from-trusteer/, last accessed on Jan. 9, 2014, 16 pages.
SafeNet, "Prevent Financial Fraud and Man-in-the-Browswer Attacks," safenet-inc.com [online] [retrieved on Oct. 15, 2013]. Retrieved from the Internet: <URL: http://www.safenetinc.browserattacks/>,5 pages.
CTNF, dated Feb. 17, 2017, re: Siying Yang, U.S. Appl. No. 15/235,909, filed Aug. 12, 2016.
NOA, dated Feb. 16, 2017, re: Justin D. Call, U.S. Appl. No. 14/822,287, filed Aug. 10, 2015.
NOA, dated Mar. 2, 2017, re: Justin D. Call, U.S. Appl. No. 14/930,198, filed Nov. 2, 2015.
NOA, dated Mar. 10, 2017, re: Roger S. Hoover, U.S. Appl. No. 14/470,082, filed Aug. 27, 2014.
CTNF, dated Mar. 10, 2017, re: Justin D. Call, U.S. Appl. No. 14/922,436, filed Oct. 25, 2015.
NOA, dated Mar. 16, 2017, re: Siying Yang, U.S. Appl. No. 15/052,951, filed Feb. 25, 2016.
NOA, dated Mar. 29, 2017, re: Siying Yang, U.S. Appl. No. 15/052,951, filed Feb. 25, 2016.
NOA, dated Apr. 11, 2017, re. Siying Yang, U.S. Appl. No. 15/052,951, filed Feb. 25, 2016.
CTFR, dated Feb. 6, 2017, re: Xiaoming Zhou, U.S. Appl. No. 15/157,704, filed May 18, 2016.
NOA, dated Mar. 7, 2017, re: Xiaoming Zhou, U.S. Appl. No. 15/157,704, filed May 18, 2016.
CTNF, dated May 22, 2017, re: Siying Yang, U.S. Appl. No. 14/329,718, filed Jul. 11, 2014.
NOA, dated May 22, 2017, re: Roger S. Hoover, U.S. Appl. No. 14/713,493, filed May 15, 2015.
NOA, dated Jun. 7, 2017, re: Call, et al., U.S. Appl. No. 14/930,198, filed Jun. 7, 2017.
CTNF, dated Jun. 2, 2017, re: Ariya Hidayat, U.S. Appl. No. 15/224,978, filed Aug. 1, 2016.
NOA, dated Jun. 30, 2017, re: Roger S. Hoover, U.S. Appl. No. 14/713,493 , filed May 15, 2015.
CTNF, dated May 25, 2017, re: Daniel G. Moen, U.S. Appl. No. 14/980,231, filed Dec. 28, 2015.
CTFR, dated Jun. 6, 2017, re: Siying Yang, U.S. Appl. No. 15/235,909 , filed Aug. 12, 2016.
NOA, dated Jun. 20, 2017, re: Roger S. Hoover , U.S. Appl. No. 14/470,082, filed Aug. 27, 2014.
NOA, dated Jul. 13, 2017, re: Xinran Wang, U.S. Appl. No. 14/286,324, filed May 23, 2014.
NOA, dated Jun. 27, 2017, re: Siying Yang, U.S. Appl. No. 14/841,013, filed Aug. 31, 2015.
NOA, dated Jun. 20, 2017, re: Siying Yang, U.S. Appl. No. 15/052,951, filed Feb. 25, 2016.
CTNF, dated Jul. 28, 2017, re: Xinran Wang, U.S. Appl. No. 15/230,540, filed Aug. 8, 2016.
NOA, dated Aug. 4, 2017, re: Justin Call, U.S. Appl. No. 14/929,019, filed Oct. 30, 2015.
CTFR, dated Aug. 14, 2017, re: Marc R. Hansen, U.S. Appl. No. 15/148,139, filed May 6, 2016.
CTNF, dated Aug. 11, 2017, re: Oscar H. Steele, III, U.S. Appl. No. 15/224,985, filed Aug. 1, 2016.
NOA, dated Aug. 29, 2017, re: Siying Yang, U.S. Appl. No. 15/052,951, filed Feb. 25, 2016.
NOA, dated Aug. 29, 2017, re: Roger S. Hoover, U.S. Appl. No. 14/713,493, filed Aug. 15, 2015.
CTNF, dated Aug. 30, 2017, re: Justin D. Call, U.S. Appl. No. 15/470,715, filed Mar. 27, 2017.
CTNF, dated Aug. 4, 2017, re: Siying Yang, U.S. Appl. No. 15/242,062, filed Aug. 19, 2016.
CTFR, dated Oct. 5, 2017, re: Justin D. Call, U.S. Appl. No. 14/922,436, filed Oct. 26, 2015.
NOA, dated Oct. 11, 2017, re: James D. Call, U.S. Appl. No. 14/822,287, filed Aug. 10, 2015.
NOA, dated Oct. 18, 2017, re: Roger S. Hoover, U.S. Appl. No. 14/470,082, filed Aug. 27, 2014.
NOA, dated Oct. 10, 2017, re: Roger S. Hoover, U.S. Appl. No. 14/713,493, filed Aug. 15, 2015.
EP App. No. 14730229.3, EP, Call et al., dated May 23, 2017.
Examination Report No. 1 for Standard Patent Application, App. No. 2014237025, AU, Call, Justin D, dated Sep. 25, 2014.
CTNF, dated Oct. 6, 2017, re: Wesley Hales, U.S. Appl. No. 14/849,459, filed Sep. 9, 2015.
CTNF, dated Nov. 13, 2017, re: Nwokedi Idika, U.S. Appl. No. 14/728,596, filed Jun. 2, 2015.
NOA, dated Jan. 9, 2018, re: Justin D. Call, U.S. Appl. No. 15/470,715, filed Mar. 27, 2017.
NOA, dated Jan. 16, 2018, re: Justin D. Call, U.S. Appl. No. 14/822,287, filed Aug. 10, 2015.
CTNF, dated Feb. 7, 2017, re: Daniel G. Moen, U.S. Appl. No. 14/980,231, filed Dec. 28, 2015.
NOA, dated Mar. 14, 2018, re: Justin Call, U.S. Appl. No. 14/929,019, filed Oct. 30, 2015.
CTNF, dated May 3, 2018, re: Marc R. Hansen, U.S. Appl. No. 15/148,139, filed May 6, 2016.
CTFR, dated Apr. 9, 2018, re: Siying Yang, U.S. Appl. No. 15/242,062, filed Aug. 19, 2016.
CTFR, dated May 10, 2018, re: Nwokedi Idika, U.S. Appl. No. 14/728,596, filed Jun. 2, 2015.

* cited by examiner

US 10,027,628 B2

CLIENT/SERVER SECURITY BY AN INTERMEDIARY RENDERING MODIFIED IN-MEMORY OBJECTS

CROSS-REFERENCE TO RELATED APPLICATIONS; BENEFIT CLAIM

This application claims the benefit as a Continuation of U.S. application. Ser. No. 14/099,437, filed Dec. 6, 2013, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s). SUGGESTED GROUP ART UNIT: 2496 (SAME AS PARENT REFERENCED ABOVE); SUGGESTED CLASSIFICATION: 726/003 (SAME AS PARENT REFERENCED ABOVE).

FIELD OF THE DISCLOSURE

The present disclosure generally relates security techniques applicable to client/server systems, and relates more specifically to techniques for improving the security of web applications and data sent and/or received between web servers hosting the web applications and browser programs and/or components of browsers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer fraud performed by obtaining information in non-secure communications transmissions between browser programs and server computers is big business for fraudsters. Fraud can be perpetrated by obtaining financial or personally identifying information that end users provide while using a browser to communicate with an application server computer. For example, in an exploit commonly termed "Man in the Browser", a user's computer can be provided with malicious code that collects data from legitimate communications, such as communications with the user's bank. After the communications have been decrypted, for example, by a web browser on the user's computer, the malicious code may gather data that is displayed in particular fields or sections in the decrypted web page and provide the data to a malicious user or computer.

Malicious code may also gather data that is entered by a user before the user's data is encrypted and sent to the intended recipient. For example, a user may enter account information into a web browser that is displaying a web page from the user's bank. The web page may be a login page to access the user's account information and funds. The malicious code may scan particular fields in the web page for the user's account information before the user's account information is encrypted and sent to the user's bank, and then send data obtained from those fields to a malicious user or computer. Web browsers were first developed and deployed in the early 1990's, and thus there has been a need to improve browser security, web server security, web-based application security, and data security at and/or between end points.

SUMMARY

The appended claims may serve as a summary of the invention.

Figure 1:
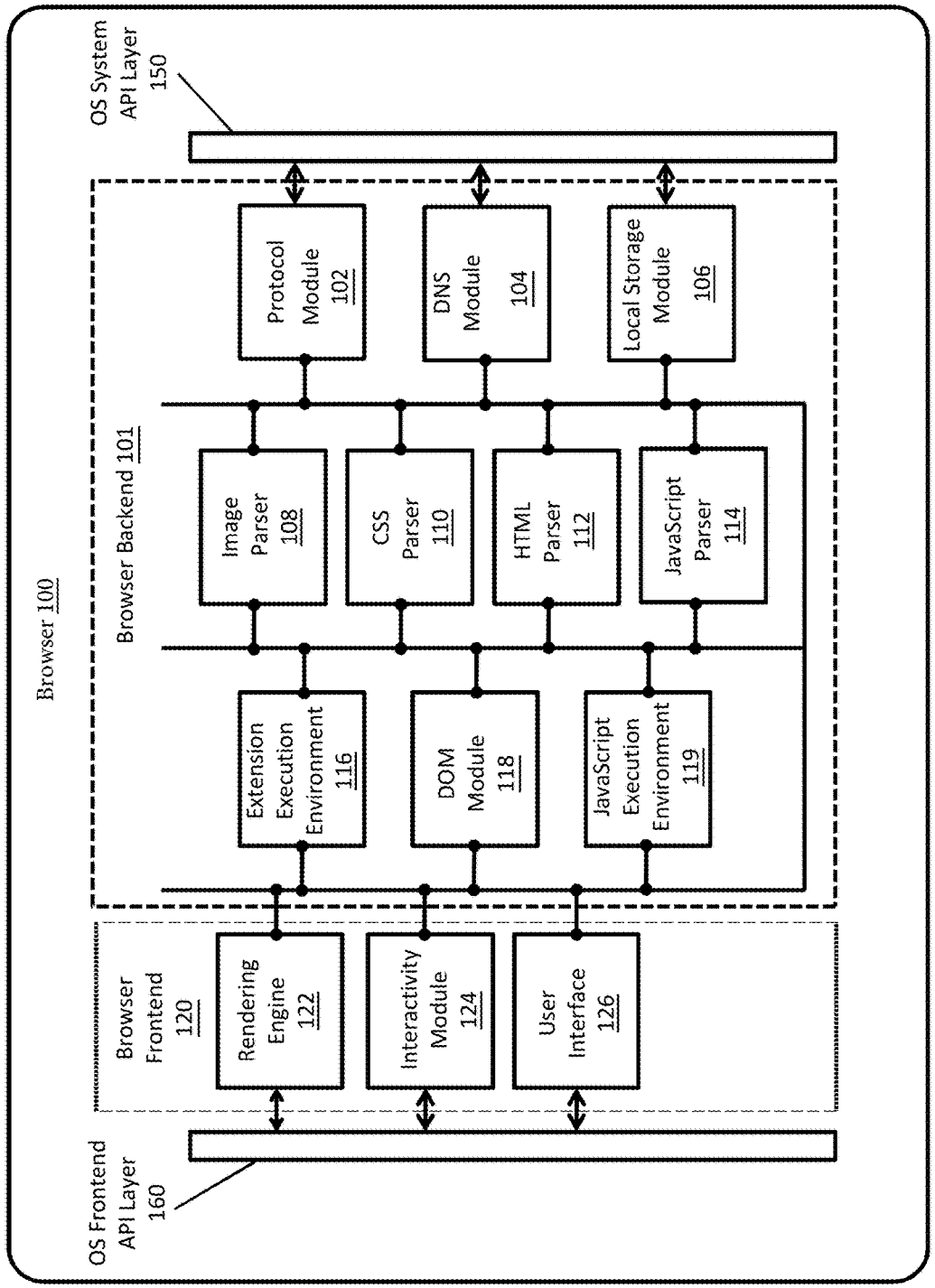
FIG. 1 illustrates functional units of a web browser, in an example embodiment.

While each of the drawing figures illustrates a particular embodiment for purposes of illustrating a clear example, other embodiments may omit, add to, reorder, and/or modify any of the elements shown in the drawing figures.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0 Terms
2.0 General Overview
3.0 Network Topology
  3.1 Visitor Browser
    3.1.1 Browser Frontend
    3.1.2 Browser Backend
  3.2 Web Infrastructure
  3.3 Intermediary
    3.3.1 Protocol Client
    3.3.2 Browser Backend
    3.3.3 Forward Translator
    3.3.4 Protocol Handler
    3.3.5 Transaction Store
    3.3.6 Reverse Translator 4.0 Process Overview
    4.1 Intercepting Instructions from a Content Server Computer and Generating New Instructions
    4.2 Caching Rendered Instructions
    4.3 Intercept a Request from a Client Computer and Translate the Request into a New Request based on a Stored Mapping
    4.4 Methods for an HTTP-based System
5.0 Implementation Mechanisms—Hardware Overview
6.0 Other Aspects of Disclosure
1.0 TERMS In certain embodiments:

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

An "object" may be a data structure that can be identified by an identifier and/or a relationship with another object. For example, an object may have a unique identifier that is a string, such as a document, customer number, or username. Accordingly, the object may be referenced and/or retrieved using the identifier. Also for example, if a particular object is the first child object of a parent object, then the particular object may be referenced and/or retrieved using a pointer to the parent object and then retrieving a pointer to the first child object. A method of referencing objects by identifier and/or relationships is called XPath. An object may be a particular type of object. For example, one object may be a button, another object may be an input, or specifically a text field, and another object may be an image.

An "attribute" may be data that identifies and/or describes the appearance, behavior, and/or content of an object. For example, an attribute may be a unique identifier, such as a name. An attribute may indicate that an object is a type of input, such as a text field, text area, checkbox, and/or radio button. An attribute may indicate that an object is a password text field; accordingly, a client application rendering the text field object on a monitor need not cause the characters that are entered into the field object to be displayed. An attribute associated with the text field object may be updated to include the value entered in the text field. Other attributes may define or describe dimension, position, color, visibility, value, and any other functional or visual aspect of an object.

A "document object model" ("DOM") may be a cross-platform and language-independent representation of one or more objects that are interrelated. For example, a DOM may represent one or more objects in an object tree and/or hierarchy. An object within the hierarchy may be a parent object, which has one or more child objects. A child object may also have one or more child objects.

"Creating, updating, and/or removing an object" may mean creating, updating, and/or removing a data structure in memory that represents an object, an object's attributes, and/or relationships between an object and one or more other objects; because these processes directly or indirectly involve changing the state of registers or other structures in electronic digital memory circuits, the processes necessarily involve using a computer to transform the state of tangible things.

An "operation" may be any function, method, script, and/or any other code, which when executed operates on an object.

"Operating on an object" may mean creating, removing, and/or updating an object. Additionally, "operating on an object" may mean performing one or more operations that use an object, attribute, and/or relationship between an object and one or more other objects as input.

"Instructions" may mean one or more codes that define one or more objects and/or one or more operations. For example, instructions may comprise HyperText Markup Language ("HTML"), eXtensible Markup Language ("XML"), cascading style sheets ("CSS"), JavaScript, and/or any other standard or proprietary languages or codes that define objects, attributes, relationships between objects, and/or operations.

"Performing instructions" or "executing instructions" may mean creating one or more objects and/or performing one or more operations defined by the instructions.

"Rendering instructions" may mean generating one or more instructions based on objects and/or operations stored in memory, such that when the generated one or more instructions are executed the same objects and/or same operations are created in memory.

A first object may be the "same" as a second object if the first object maintains the same one or more values, attributes, and/or relationships as the second object. The underlying representation of the first object in memory need not be the same as the underlying representation of the second object in memory. For purposes of illustrating a clear example, assume that a first program is allocated a first memory segment; a second program is allocated a second segment; the first program maintains a first object in the first memory segment; the second program maintains a second object in the second memory segment; the first object comprises a value: six; the second object comprises a value: six. In this situation, the first object and the second object may be the same object because the first object maintains the same value as the second object, even though the first object and the second object are located in different memory segments.

If the value stored in the first memory segment is stored as an 8-bit integer and the value stored in the second memory segment is stored as an American Standard Code for Information Interchange ("ASCII") string, then the first object and the second object may be the same object because the first object maintains the same value as the second object, even though the underlying representation of the value in the first memory segment is stored differently than the representation of the value in the second memory segment.

As another example, assume that the first program is running on a first computer that comprises a 32-bit processor and addresses memory using 32-bit addresses; the second program is running on a second computer that comprises a 64-bit processor and addresses memory using 64-bit addresses; the first object is a parent object and comprises a pointer to a child object stored in the first memory segment; the second object is a parent object and comprises a pointer to a child object stored in the second memory segment. In this situation, the first object and the second object may be the same object because the first object maintains the same values and relationships as the second object, even though the pointer to the child stored in the first memory segment may be a 32-bit pointer and the pointer in the second memory segment may be a 64-bit pointer.

If the first program stores the data that represents the first object contiguously in the first memory segment and the second program stores the data that represents the second object scattered throughout the second memory segment, then the first object and the second object may be the same object, even though the underlying data structure that represents the first object is stored differently than the underlying data structure that represents the second object.

Or, for example, assume the first program is a first HTTP browser; the second program is a second, different HTTP browser; the first object may have an attribute, "id"; the second object may have an attribute, "id"; the value for the "id" attribute is "MyObject" for both the first object and the second object is. In this situation, the underlying representation of the first object in the first browser may be drastically different than the underlying representation of the second object in the second browser. However, the operations that operate on the two objects may be programmatically identical. For example, the same JavaScript executed by the first HTTP browser and the second HTTP browser may retrieve the first object maintained by the first HTTP browser and the second object, respectively: document.getElementById("MyObject").

Other factors that may result in a different underlying representation of the same object may include the endianness of a processor, amount of memory available, different applications, and/or any other different hardware and/or software configurations.

"Data" may mean any data and/or instructions in electronic digital memory.

An "attribute map" may be a map from one attribute name and/or value to one or more other names and/or values. For example, assume an object has an attribute, "id", which defines a unique identifier: "MyObject". An attribute map may associate "MyObject" with a different unique identifier, such as "tcejbOyM". Additionally, an attribute map may be used to map a modified attribute name and/or value to an original name and/or value. An attribute map may be an operation, hash map, and/or any other method or associative data structure.

A "DOM map" may be a map from a first DOM to a second, different DOM. For example, a DOM map may be a collection of attribute maps. Each attribute map in the DOM map may be an attribute map for an attribute of an object in a first DOM with a modified attribute in a second DOM. Additionally or alternatively, a DOM map may map one hierarchy to another, different hierarchy, and back again. For example, a DOM map may modify a relationship between a first object and a second object, such that a first object is not related to a second object in a first DOM, and the first object is a parent object to the second object in the second DOM.

A "browser" may be one or more computer programs or other software elements stored in electronic digital memory and running on a computer that receives instructions from a server computer, performs one or more of the received instructions, causes to display content, provides a user interface ("UI") to receive user inputs, and/or receives and responds to one or more inputs from a user based on or according to the one or more performed instructions. A browser and/or components of a browser may be implemented into an application. For example, a browser and/or components of a browser may be implemented into a mobile application as part of a web view, and/or web view controller, to send and/or receive data over HTTP and/or other protocol. A user may use a browser to send data to a server computer. The server computer may respond with additional instructions.

A "headless browser" may be a browser that does not cause visually displaying or rendering graphical images of objects that are defined in a set of received instructions according to the received set of instructions. Additionally or alternatively, a "headless browser" may be a browser that does not respond to user inputs according to a set of received instructions.

"Sending and/or receiving data over HTTP" may mean sending and/or receiving data and/or instructions using HyperText Transfer Protocol. Additionally or alternatively, "sending and/or receiving data over HTTP" may mean sending and/or receiving data and/or instructions using a subset of the HTTP, such as secure HTTP (HTTPS). Additionally or alternatively, one or more other protocols may be used, such as SPDY.

A "web browser" may be a browser that receives instructions comprising HTML, CSS, and/or JavaScript over HTTP or some derivative thereof, such as HTTPS.

A "bot" may mean a computer and/or software executed by a computer that automates sending and/or receiving data. For example, a bot may be a web scraper, web crawler, automatic web browser, and/or any other tool designed to submit and/or receive data from one or more web servers. A bot may comprise complex logic designed to respond to data received from one or more web servers.

2.0 General Overview

In an embodiment, performing one or more of the methods discussed herein may prevent, and/or reduce the effectiveness of, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities. For example, if an intermediary computer intercepts an improper request from a visitor browser, such as a request that does not include one or more identifiers that match one or more attribute map identifiers, DOM map identifiers, and/or transaction identifiers, then the intermediary computer need not reverse translate and/or forward the improper request on to the targeted web server computer. Thus, the targeted web server computer, or an application running on the targeted web server computer, need not be burdened with processing improper and/or malicious requests that are part of an attack.

In an embodiment, after an intermediary computer intercepts a request with a particular identifier, based on a rendered set of instructions by the intermediary computer, the particular identifier may no longer be valid. Accordingly, if the same visitor browser and/or a different visitor browser uses the same particular identifier in an additional request, the intermediary computer need not reverse translate and/or forward the improper request to the targeted web server computer. Thus, the targeted web server computer, or an application running on the targeted web server computer, need not be affected by one or more attacks, such as a DOS attack and/or cross-site request forgery.

In an embodiment, each time a web page is requested, such as an account creation page, order page, voting page, and/or other page from a web server computer, the intermediary computer may modify the identifiers in the returned page. Thus, a bot may receive a different set of instructions after each request and may not observe the same one or more field identifiers twice. Without receiving the same one or more identifiers, the bot may be incapable of determining what data should be entered in and/or associated with each field to create a fake account, order and/or reserve one or more goods or services, vote, inject malicious SQL, and/or submit any other malicious content.

In an embodiment, the DOM hierarchy, a portion of the DOM hierarchy, and/or one or more particular identifiers are modified each time a web page is requested. For example, a container that stores the definition of a word or phrase may, in the originally intercepted instructions, be in a particular spot in the DOM hierarchy and/or include a particular identifier: "definition". However, the intermediary computer may manipulate the DOM hierarchy and/or identifier each time the page or a similar page is served. Thus, a bot may not be able to determine which container holds the target content. Furthermore, an automated vulnerability bot may not be able to determine whether target content was inserted and/or changed. For example, if a bot submits content designed to employ SQL, HTML, JavaScript, and/or any other code injection, the bot may not be able to determine which container is supposed to contain content generated by a successful attack.

In an embodiment, a bot, such as a website scraper may be whitelisted. If the bot includes a particular password or other code, then the intermediary computer may send the original instructions and/or a portion of the original instructions to the bot. Thus, the intermediary computer may allow the authorized bot to perform an automated task on an entire page and/or a portion of the page. Otherwise, the intermediary computer may use one or more of the methods discussed herein.

In an embodiment, a method comprises intercepting, from a server computer, a first set of instructions that define one or more objects and one or more operations that are based, at least in part, on the one or more objects; generating, in memory, one or more data structures that correspond to the one or more objects; performing the one or more operations on the one or more data structures; updating the one or more data structures, in response to performing the one or more operations, to produce one or more updated data structures; rendering a second set of instructions, which when executed by a remote client computer cause the remote client computer to generate the one or more updated data structures in memory on the remote client computer, wherein the second set of instructions are different than the first set of instructions; sending the second set of instructions to the remote client computer.

In an embodiment, wherein each object of the one or more objects includes an original identifier, the method comprises generating a data structure, for each object of the one or more objects, wherein the data structure corresponds to the object and includes the original identifier included in the object; updating the original identifier included in the data structure for each object to produce a modified identifier and a modified data structure of the one or more updated data structures.

In an embodiment, the method comprises storing a mapping between the modified identifier and the original identifier for each object; intercepting, from the remote client computer, a request that includes one or more modified identifiers; determining the original identifier for each modified identifier included in the request; replacing each modified identifier in the request with the original identifier to produce a modified request; sending the modified request to the server computer.

In an embodiment, a method comprises intercepting, from a web server computer, over HTTP, an original HTML document, a set of original CSS codes, and a set of original JavaScript codes that define one or more objects in an original DOM and one or more operations that are based, at least in part, on the one or more objects in the original DOM; generating one or more data structures that correspond with the one or more objects in the original DOM; processing the set of original CSS codes and the set of original JavaScript codes on the one or more data structures; updating the one or more data structures, in response to processing the set of original CSS codes and the set of original JavaScript codes, to produce one or more updated data structures; rendering a modified HTML document, a set of modified CSS codes, and a set of modified JavaScript codes, which when processed by a remote client computer cause the remote client computer to generate the one or more updated data structures in memory on the remote client computer; wherein the modified HTML document defines a modified DOM that is different than the original DOM; wherein the modified HTML document, the set of modified CSS codes, and the set of modified JavaScript codes are different than the original HTML document, the set of original CSS codes, and the set of original JavaScript codes; generating a DOM mapping between the modified DOM and the original DOM; storing the DOM mapping; sending the modified HTML document, the set of modified CSS codes, and the set of modified JavaScript codes to the remote client computer; intercepting, from the remote client computer, a request based on the modified DOM; translating the request based, at least in part, on the DOM mapping to produce a translated request based on the original DOM; sending the translated request to the web server computer.

3.0 Network Topology

Figure 2:
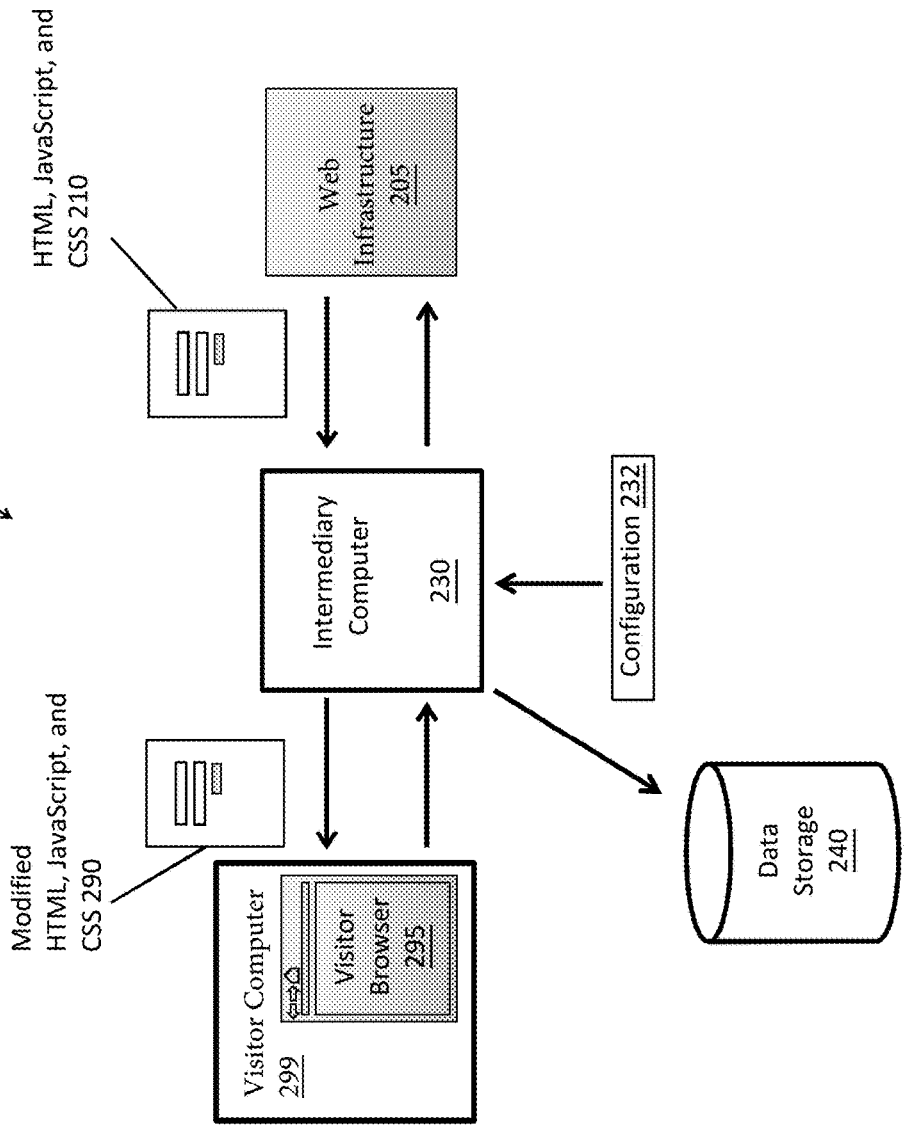
FIG. 2 illustrates a computer system comprising a server security and re-rendering system, in an example embodiment.

FIG. 1 illustrates functional units of a web browser, in an example embodiment. FIG. 2 illustrates a system comprising a server security and a re-rendering system, in an example embodiment. Referring first to FIG. 2, system 200 includes web infrastructure 205, visitor computer 299, intermediary computer 230, and data storage 240, distributed across a plurality of interconnected networks. While each of the components listed above are illustrated as if running on a separate, remote computer from each other, one or more of the components listed above may be part of and/or executed on the same computer. For example, HTTP intermediary computer 230, data storage 240, and/or web infrastructure 205 may be executed on the same computer, local area, and/or wide area network. Additionally or alternatively, intermediary computer 230 is a proxy server for web infrastructure 205. Additionally or alternatively, intermediary computer 230 may be in line between a router and web infrastructure 205, such that all network data sent to, and/or sent from, web infrastructure 205 over one or more protocols may be intercepted by intermediary computer 230.

3.1 Visitor Browser

Visitor browser 295 may be a browser that is executed on visitor computer 299 and operated by a user using visitor computer 299. For example, visitor browser 295 may be a web browser. FIG. 1 illustrates a more detailed view of a web browser, in an example embodiment. In this context, "visitor" refers to any user who is using the computer 299 to contact, communicate with or otherwise conceptually visit the web infrastructure 205. Furthermore, visitor browser 295 may be described with reference to browser 100 in FIG. 1, but using the particular arrangement illustrated in FIG. 1 is not required in other embodiments.

Referring now to FIG. 1, browser 100 includes browser backend 101, browser frontend 120, operating system ("OS") system application programming interface ("API") layer 150, and OS frontend API layer 160.

3.1.1 Browser Frontend

Browser frontend 120 comprises rendering engine 122, interactivity module 124, and user interface 126. Each of the components may cause, through OS frontend API layer 160, one or more objects to be presented and/or updated visually and/or audibly to a user using visitor computer 299.

Rendering engine 122 may determine how objects are presented to a user. For example, rendering engine 122 may determine the color, shape, orientation, position, and/or any other visual and/or audio attribute of an image, text field, button, and/or any other object defined by a set of received instructions. Furthermore, rendering engine 122 may cause a button to be displayed on a monitor coupled to visitor computer 299 through OS frontend API layer 160.

User interface 126 may determine what may be presented to a user. For example, user interface 126 may determine that a "submit" button should be hidden until data has been entered in one or more text fields. After data has been entered in the one or more text fields, user interface 126 may notify rendering engine 122 to render the "submit" button accordingly.

Interactivity module 124 may receive one or more inputs through OS Frontend API layer 160. For example, in response to a user pressing a button on a mouse coupled to visitor computer 299, the operating system running on visitor computer 299 may send a message to interactivity module 124, through OS frontend API layer 160, to indicate that a user pressed a button on a mouse. Interactivity module 124 may determine that a user selected a particular button currently presented on a monitor. Interactively module 124 may notify user interface 126 and/or rendering engine 122 to update to update the UI accordingly.

3.1.2 Browser Backend

Browser backend 101 comprises protocol module 102, domain name server ("DNS") module 104, local storage module 106, image parser 108, CSS parser 110, HTML parser 112, JavaScript parser 114, extension execution environment 116, document object model ("DOM") module 118, and JavaScript execution environment 119. Other embodiments may use other protocols, modules, and/or parsers. A browser that includes a browser backend, but does not include a browser frontend, may be a headless browser.

Protocol module 102, DNS module 104, and local storage module 106 may send and/or receive data through OS System API layer 150. For example, protocol module 102 may send and/or receive data over any protocol, such as HTTP, to/from intermediary computer 230 and/or web infrastructure 205 through OS system API layer 150. Data received through protocol module 102 may reference data sources by one or more domain names. DNS module 104 may resolve the one or more domain names referenced by interfacing with one or more remote domain name servers through OS system API layer 150. Local storage module may store and/or recall data from memory through OS system API layer 150.

Image parser 108, CSS Parser 110, HTML parser 112, and JavaScript parser 114 may parse data received through protocol module 102. HTML parser 112 may parse HTML data. CSS parser 110 may parse CSS data. JavaScript parser 114 may parse JavaScript data. Image parser 108 may parse image data. Each parser may generate and/or update objects in a DOM maintained by DOM module 118.

Browser backend 101 may comprise one or more programmable engines, such as extension execution environment 116 and JavaScript execution environment 119. Extensions may be written one or more programming languages include JavaScript, Python, Ruby, and/or any other language. Each programmable engine may have access to DOM module 118 and may operate on one or more objects from a DOM maintained by DOM module 118. For example, JavaScript execution environment 119 may execute JavaScript parsed by JavaScript parser 114 and in response, create, update, and/or delete one or more objects managed by DOM module 118.

3.2 Web Infrastructure

Referring again to FIG. 2, web infrastructure 205 may be one or more server computers that receive requests for data from users, such as a user using visitor browser 295, through intermediary computer 230. In response, web infrastructure 205 may send data to visitor browser 295, through intermediary computer 230. As illustrated in FIG. 2 the data sent from web infrastructure 205 may include instructions: HTML, JavaScript, and CSS 210.

Figure 3:
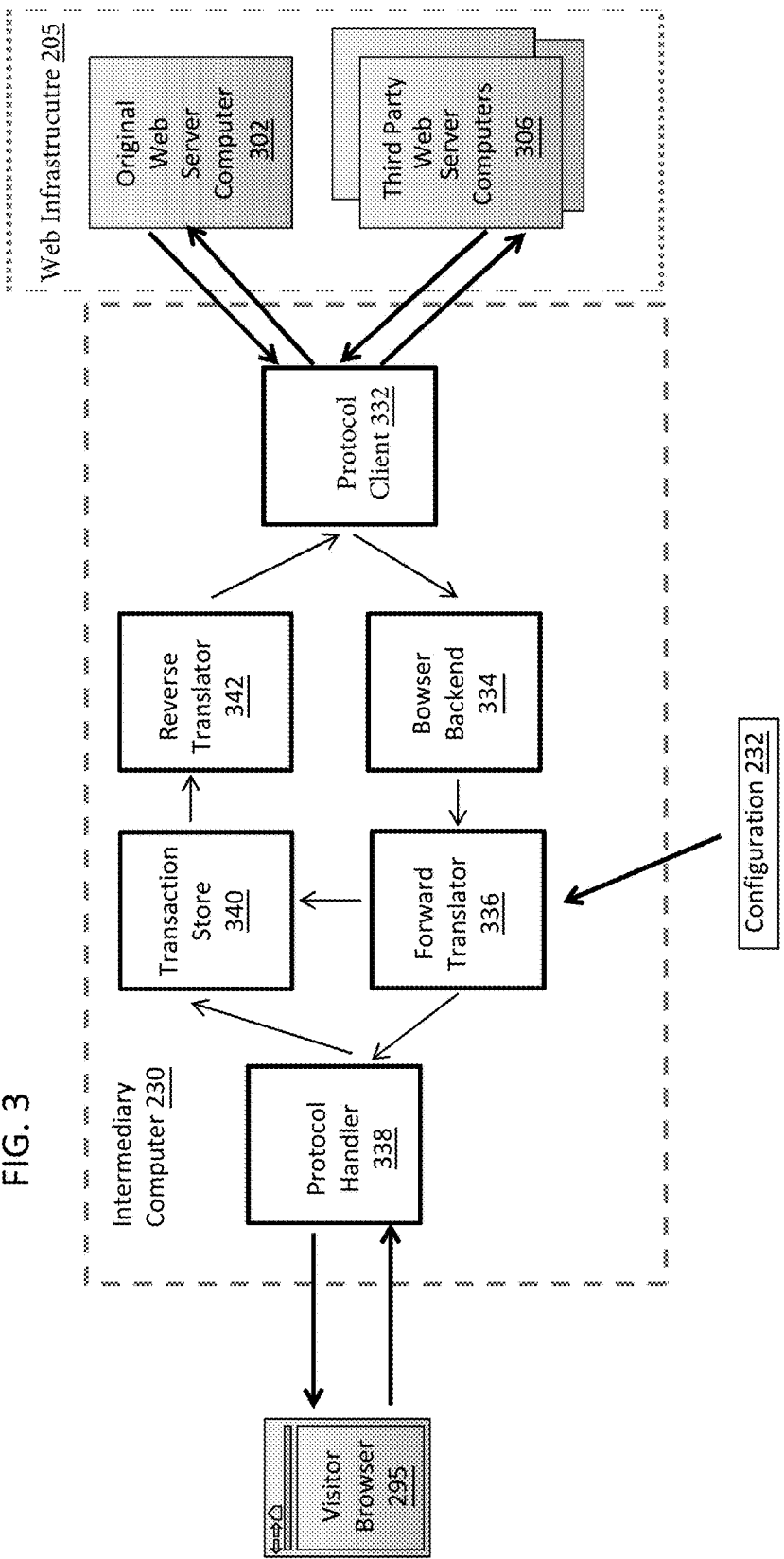
FIG. 3 illustrates an intermediary computer and a web infrastructure in an example embodiment.

FIG. 3 illustrates a web infrastructure in an example embodiment. The web infrastructure 205 may be described with reference to original web server computer 302 and third party web server computers 306 in FIG. 3, but using the particular arrangement illustrated in FIG. 3 is not required in other embodiments.

Original web server computer 302 may be a server computer that receives requests for data and responds with data. For example, original web server computer 302 may be an HTTP-based web server that receives HTTP requests and responds with data comprising HTML, CSS, and/or JavaScript instructions. Additionally or alternatively, original web server computer 302 may respond with data that references data on other server computers, such as third party web server computers 306.

Third party web server computers 306 may be one or more server computers that store additional data referenced by instructions sent from original web server computer 302. For example, data from original web server computer 302 may include a reference to a JavaScript file stored on third party web server computers 306. Accordingly, a browser backend, such as a browser backend 101, may request the referenced JavaScript file from third party web server computers 306. Also for example, data from original web server computer 302 may include a reference to an image stored on third party web server computers 306. Accordingly, a browser backend, such as browser backend 101, may request the referenced image from third party web server computers 306.

3.3 Intermediary

Returning now to FIG. 2, intermediary computer 230 may intercept instructions sent from web infrastructure 205, generate new instructions, and send the new instructions to visitor browser 295. For example, intermediary computer 230 may intercept HTML, JavaScript, and CSS 210, generate HTML, JavaScript, and CSS 290 (which may be different than HTML, JavaScript, and CSS 210), and send HTML, JavaScript, and CSS 290 to visitor browser 295. Additionally, intermediary computer 230 may intercept a request from visitor browser 295, generate a new, modified request, and send the new, modified request to web infrastructure 205.

In FIG. 2, intermediary computer 230 may be an HTTP intermediary that intercepts and modifies HTML, JavaScript, CSS, and HTTP requests for HTTP web browsers. However, intermediary computer 230 may be an intermediary for any other standard and/or proprietary protocol. Furthermore, each of the components discussed, which intermediary computer 230 is comprised of, may be configured to perform any of the processes and/or methods discussed herein for any standard and/or proprietary protocol.

Intermediary computer 230 may be a server computer that is located on the same network as web infrastructure 205. Additionally or alternatively, intermediary computer 230 may be topologically located between a public-facing router and web infrastructure 205. Accordingly, requests from visitor browser 295 to web infrastructure 205 may be passed through and/or modified by intermediary computer 230. Furthermore, instructions from web infrastructure 205 to visitor browser 295 may be passed through and/or modified by intermediary computer 230. Additionally or alternatively, intermediary computer 230 may be a proxy server and/or router. Additionally or alternatively, intermediary computer 230 and/or components of intermediary computer 230 may be a software layer, executed on one or more computers in web infrastructure 205. Additionally or alternatively, intermediary computer 230 may be a server computer that one or more domain name servers list as a destination IP address. Accordingly, intermediary computer 230 may receive requests sent to the one or more domains from visitor browser 295. Based on the domain name in a request, intermediary computer 230 may forward the request, or a modified request, to a server computer in web infrastructure 205, such as original web server computer 302.

FIG. 3 illustrates, among other things, a more detailed view of intermediary computer 230, in an example embodiment. The intermediary computer 230 may be described with reference to several components illustrated in FIG. 3 and discussed in detail below, but using the particular arrangement illustrated in FIG. 3 is not required in other embodiments. Turning now to FIG. 3, intermediary computer 230 may comprise protocol client 332, browser backend 334, forward translator 336, protocol handler 338, transaction store 340, and reverse translator 342. In an embodiment, each of the functional units of intermediary computer 230 may be implemented using any of the techniques further described herein in connection with FIG. 9; for example, the intermediary computer may comprise a general-purpose computer configured with one or more stored programs which when executed cause performing the functions described herein for the intermediary computer, or a special-purpose computer with digital logic that is configured to execute the functions, or digital logic that is used in other computing devices.

3.3.1 Protocol Client

Protocol client 332 may intercept data over any standard or proprietary protocol. For example, protocol client 332 may intercept data over HTTP. Accordingly, protocol client 332 may be communicatively coupled with web infrastructure 205, original web server computer 302, and third party web server computers 306.

3.3.2 Browser Backend

Browser backend 334 may be an HTTP-based headless browser similar to browser backend 101. Additionally or alternatively, browser backend 334 may be a headless browser based on one or more other standard and/or proprietary protocols.

Browser backend 334 may perform instructions intercepted by protocol client 332. After performing the instructions, browser backend 334 may notify forward translator 336 to begin rendering instructions based on the objects created by browser backend 334 that are currently in memory. Accordingly, browser backend 334 and forward translator 336 may be communicatively coupled.

Browser backend 334 may make requests for additional data. For example, if instructions received from Protocol client 332 reference additional instructions stored on a third party web server, browser backend 334 may request the additional instructions through protocol client 332. Accordingly, browser backend 334 and protocol client 332 are communicatively coupled.

3.3.3 Forward Translator

Forward translator 336 may operate on the objects created by browser backend 334 and generate one or more attribute maps and/or DOM maps. Additionally or alternatively, forward translator 336 may render a new set of instructions based on the one or more objects and/or operations in memory. Forward translator 336 may operate on objects and/or render instructions based on one or more configurations specified in configuration 232. Accordingly, forward translator 336 may be communicatively coupled to configuration 232. Forward translator 336 may send the rendered instructions to protocol handler 338. Accordingly, forward translator 336 may be communicatively coupled to protocol handler 338.

3.3.4 Protocol Handler

Protocol handler 338 may receive the instructions generated by forward translator 336 and send the generated instructions to visitor browser 195. Additionally or alternatively, protocol handler 338 may intercept requests from visitor browser 195 and forward the requests to transaction store 340. Accordingly, protocol handler 338 may be communicatively coupled to visitor browser 195, forward translator 336, and transaction store 340.

3.3.5 Transaction Store

Transaction store 340 may receive requests intercepted by protocol handler 338 from visitor browser 295. Transaction store 340 may retrieve one or more attribute maps and/or DOM maps, based on data in the request, and forward the request with the retrieved one or more attribute maps and/or DOM maps to reverse translator 342. Accordingly, transaction store 340 may be communicatively coupled with reverse translator 342.

3.3.6 Reverse Translator

Reverse translator 342 may translate requests intercepted by protocol handler 338, which are based on instructions generated by forward translator 336, into requests that would have been generated by visitor browser 195 had visitor browser 195 received the original instructions sent from original web server computer 302. Reverse translator 342 may translate requests based on the one or more attribute maps and/or DOM maps retrieved by transaction store 340. Reverse translator 342 may send the translated request to original web server computer 302 through protocol client 332. Accordingly, reverse translator 342 may be communicatively coupled with protocol client 332.

4.0 Process Overview

In an embodiment, a data processing method may be configured to intercept instructions from a server computer and generate new, different instructions based on the intercepted instructions. In an embodiment, a data processing method may be configured for caching new instructions, intercepting client requests to a server computer, translating the request to produce a new request, and/or sending the new request to a server computer. Various embodiments may use HTTP and/or specialized web-based instructions, such as HTML, CSS, and/or JavaScript, and/or standard and/or proprietary protocol(s) and/or instructions.

Figure 4:
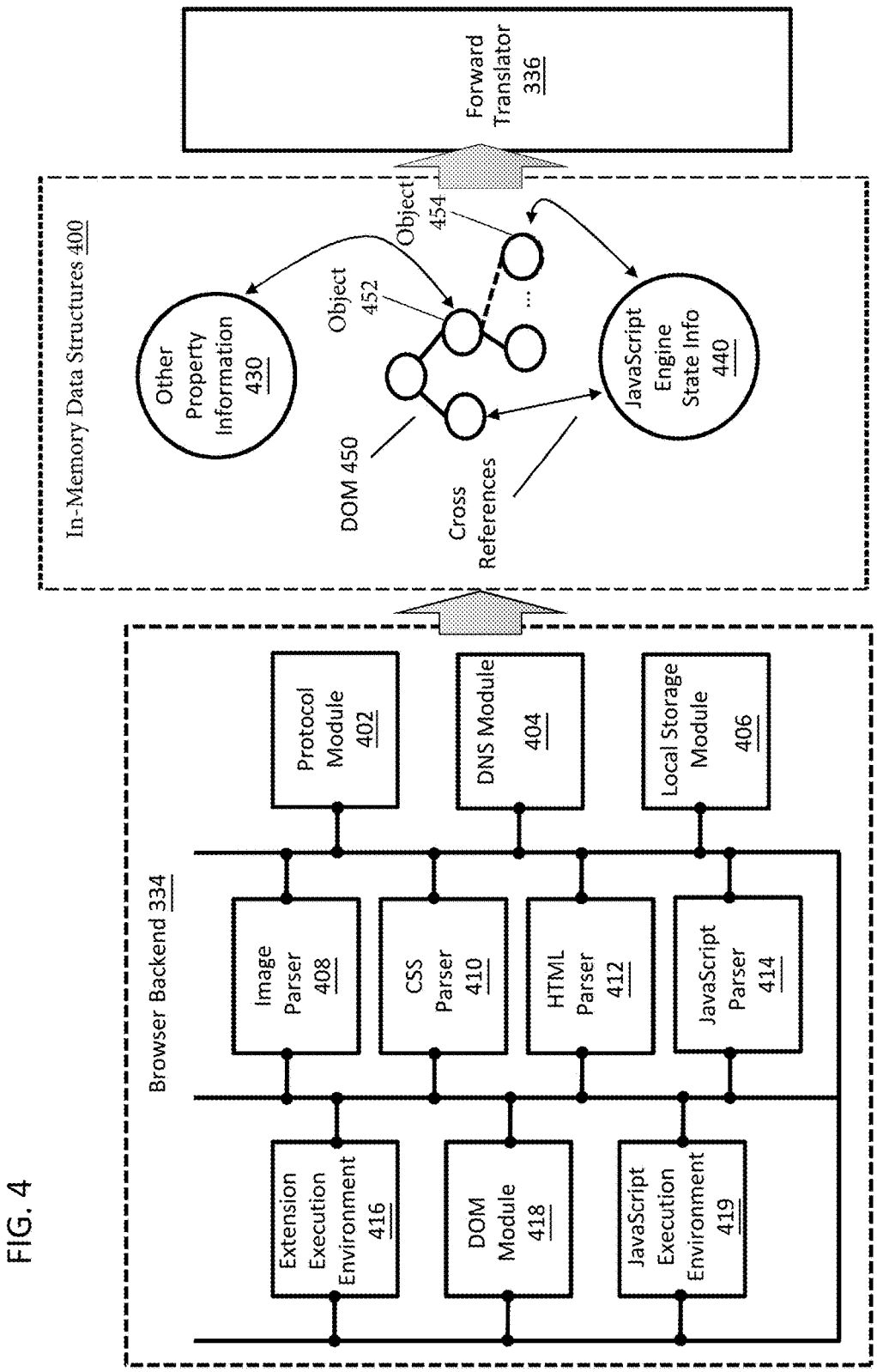
FIG. 4 illustrates objects and operations stored in memory by a browser backend, or headless browser, in an example embodiment.
Figure 5:
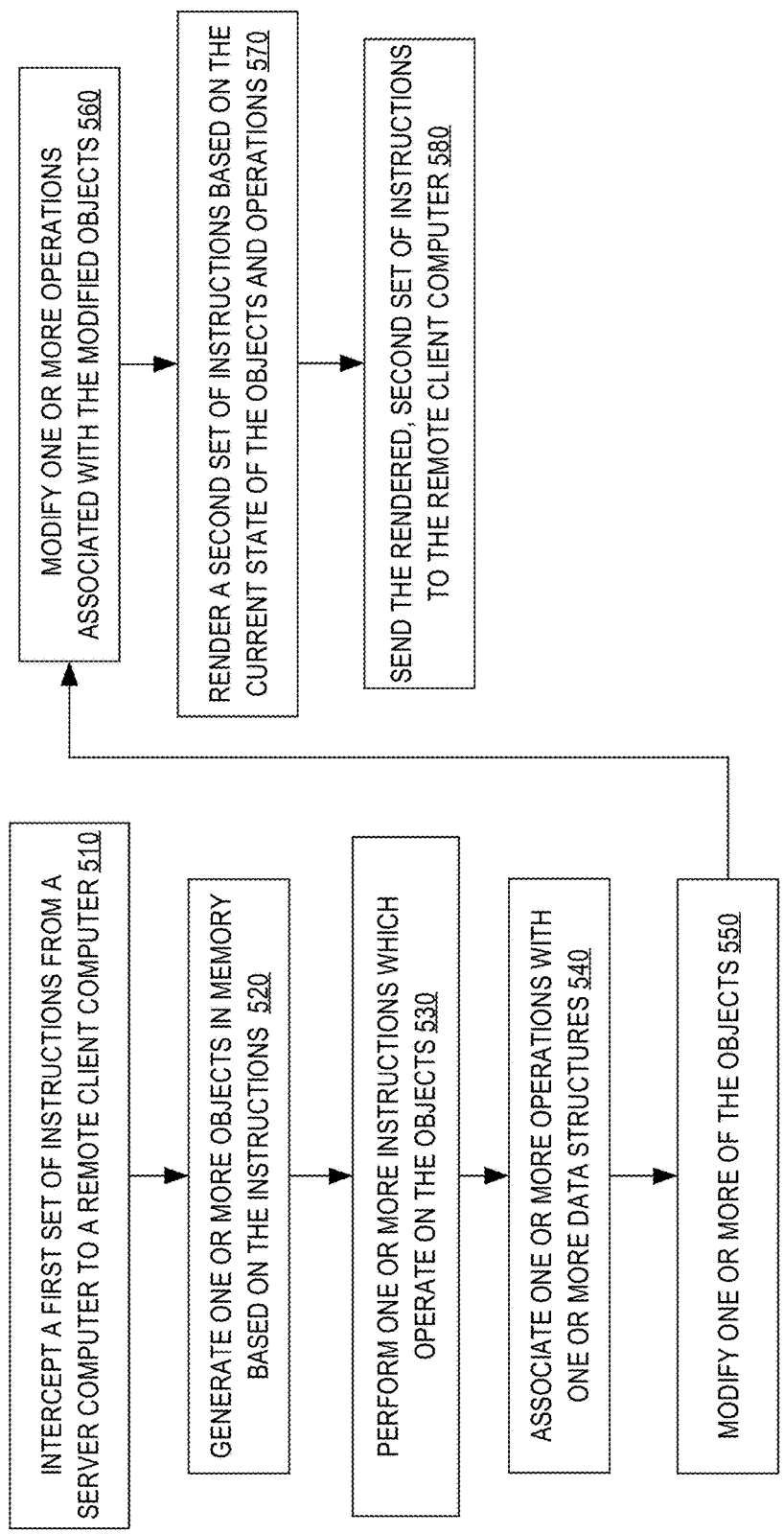
FIG. 5 illustrates a process for intercepting instructions for a server computer, rendering new instructions, and sending the new instructions to the intended client, in an example embodiment.

4.1 Intercepting Instructions from a Content Server Computer and Generating New Instructions FIG. 5 illustrates a process for intercepting instructions for a server computer, rendering new instructions, and sending the new instructions to the intended client, in an example embodiment. For purposes of illustrating a clear example, FIG. 5 may be described with reference to FIG. 3 and FIG. 4, but using the particular arrangements illustrated in FIG. 3 or FIG. 4 are not required in other embodiments.

Turning now to step 510, in FIG. 5, an intermediary computer intercepts a first set of instructions from a remote server computer. For example, protocol client 332 may receive instructions from original web server computer 302, in response to a request from visitor browser 295. The instructions may comprise HTML, CSS, and/or JavaScript.

In step 520, the intermediary computer generates one or more objects in memory based on the instructions. For example, protocol client 332 may send the HTML, CSS, and/or JavaScript to browser backend 334. Browser backend 334 may generate a DOM in memory containing objects defined in the instructions. FIG. 4 illustrates objects and operations stored in memory by browser backend 334, in an example embodiment. HTML parser 412 may parse the HTML received by browser backend 334. Based on the parsed HTML, DOM module 418 may create DOM 450 and objects in DOM 450: object 452 and object 454. Furthermore, based on the parsed HTML, DOM module 418 may define object 452 to be the parent object of object 454 in DOM 450. Additionally, one or more objects in DOM 450 may comprise one or more attributes based on the parsed HTML.

In step 530, the intermediary computer performs one or more instructions which operate on the objects. For purposes of illustrating a clear example, assume object 452 comprises an attribute that is a unique identifier. Also assume one or more CSS instructions identify object 452 by its unique identifier and define one or more attributes to assign to, and/or associate with, object 452. Accordingly, CSS parser 410 may parse the CSS received by browser backend 334. DOM module 418 may create and/or update other property information 430 to include the one or more attributes defined in the CSS instructions. DOM module 418 may associate other property information 430, and/or one or more attributes in other property information 430, to object 452.

As an example, the JavaScript instructions define one or more operations, which when performed operate on one or more objects defined in the HTML instructions. One or more JavaScript instructions may indicate that the one or more operations may be performed after the objects defined in the HTML instructions are loaded in memory and/or after the CSS instructions have been performed without additional user input. The JavaScript parser 414 may parse the JavaScript received by browser backend 334. JavaScript execution environment 419 may execute the one or more operations, which operate on the one or more the objects, one or more attributes of objects, and/or relationships between the objects in DOM 450.

Instructions performed after the objects defined in the HTML instructions are loaded in memory may drastically change the DOM and/or the objects in the DOM. For example, one or more JavaScript operations may change object 452 to a different type of object. Also for example, one or more JavaScript operations may create, update, and/or delete object 452. Additionally or alternatively, one or more JavaScript operations may create, update, and/or delete data included and/or associated with object 452. Additionally or alternatively, one or more JavaScript operations may create, update, and/or remove associations between objects. For example, one or more JavaScript operations may associate object 452 with object 454, such that object 452 may become a parent object of object 454, as illustrated by the dashed line between object 452 and object 454.

In step 540, the intermediary computer associates one or more operations with one or more objects. As an example, the JavaScript instructions may define an operation, which when performed, operate on one or more objects defined in DOM 450; the operation references object 454 by an identifier; object 454 is the second child of object 452; object 454 is a particular type of object, which is different than the other objects that are children objects of object 452; and one or more JavaScript instructions indicate that the operation may be performed upon some event, such as a user selecting button and/or entering an input.

JavaScript parser 414 may parse the JavaScript received by browser backend 334, which defines the operation. JavaScript parser 414, DOM module 418, and/or JavaScript execution environment 419 may generate JavaScript engine state info 440 included in in-memory data structures 400. JavaScript parser 414, DOM module 418, and/or JavaScript execution environment 419 may generate a representation of the operation that references object 454 in JavaScript engine state info 440. The representation of the operation in JavaScript engine state info 440 may include a cross reference to an identifier for object 454. Additionally or alternatively, the representation of the operation in JavaScript engine state info 440 may include a cross reference to an identifier for object 454 based on the topology of object 454 in DOM 450: second child of object 452 and/or first child of object 452 that is the particular type, which is a different type than the type(s) of other child objects of object 452. JavaScript engine state info 440 may include one or more other operations and/or representations of one or more other operations.

In step 550, the intermediary computer modifies one or more of the objects. For example, forward translator 336 may create, update, and/or delete identifiers for one or more of the objects in DOM 450, such as the names of the one or more objects. Forward translator 336 may implement one or more methods to modify identifiers, such as generating random identifiers.

In step 560, the intermediary computer modifies one or more operations associated with the modified objects. For example, forward translator 336 may update the references in JavaScript engine state info 440 to use the new identifiers from step 550.

In step 570, the intermediary computer renders a second set of instructions based on the current state of the objects and operations. As discussed earlier, the originally received instructions need not be HTML, CSS, and/or JavaScript instructions. Furthermore, the rendered instructions need not be HTML, CSS, and/or JavaScript instructions. However, for purposes of illustrating a clear example, assume that the originally received instructions in step 510 comprise HTML, CSS, and JavaScript instructions. Furthermore, assume that forward translator 336 is configured to generate HTML, CSS, and/or JavaScript instructions. The forward translator 336 may render instructions, which when executed, generate the same objects and/or operations as currently existing in in-memory data structures 400. However, the rendered instructions may comprise different HTML, CSS, and/or JavaScript codes that the originally receive HTML, CSS, and JavaScript instructions. For example, the rendered instructions may use different identifiers for the objects defined in the rendered instructions than the original instructions.

Additionally or alternatively, the original instructions may comprise HTML, CSS, and/or JavaScript instructions and the rendered instructions may have one or more of the object attributes originally defined in the CSS instructions integrated into the HTML instructions and/or the JavaScript instructions. Accordingly, in an embodiment, the rendered instructions may comprise HTML and JavaScript instructions, but not CSS instructions. However, the new, rendered HTML and JavaScript instructions, when executed, may generate objects and/or operations that are the same as the objects and/or operations in in-memory data structures 400 when the new HTML and JavaScript instructions were rendered.

Additionally or alternatively, the rendered instructions may comprise HTML and/or CSS instruction that define fewer objects than defined in in-memory data structures 400. However, the rendered JavaScript instructions may define operations, which when executed generate objects that were not defined in the rendered HTML and/or CSS instructions. Therefore, the new, rendered HTML, CSS, and JavaScript instructions, when executed, may generate objects and/or operations that are the same as the objects and/or operations in in-memory data structures 400 when the new instructions were rendered.

Additionally or alternatively, the rendered instructions may comprise one or more HTML documents, which comprise the original CSS instructions and/or JavaScript instructions embedded into the one or more HTML documents. Accordingly, the new, rendered HTML instructions, when executed, may generate objects and/or operations as currently existing in in-memory data structures 400 when the new HTML instructions were rendered.

Additionally or alternatively, the rendered CSS and/or JavaScript instructions may reference objects by XPath commands instead of by one or more unique identifiers, or vice versa. XPath commands may be used to identify objects in a DOM and/or hierarchy by the topology of the DOM and/or hierarchy. Accordingly, the new, rendered HTML, CSS, and JavaScript instructions, when executed, may generate objects and/or operations that are the same as the objects and/or operations in in-memory data structures 400 when the new instructions were rendered.

Additionally or alternatively, the rendered HTML instructions may define objects in in-memory data structures 400, but without one or more attributes. However, the rendered CSS instructions and/or JavaScript instructions may define operations, which when executed, update the objects to include the missing attributes. Accordingly, the new, rendered HTML, CSS, and JavaScript instructions, when executed, may generate objects and/or operations that are the same as the objects and/or operations in in-memory data structures 400 when the new instructions were rendered.

Additionally or alternatively, the rendered HTML instructions may define the objects in in-memory data structures 400, but in a different hierarchy, such as the relationship between object 452 and object 454 is not defined. However, the rendered JavaScript instructions may define operations, which when executed may update and/or re-organize the relationships between the objects such that object 452 is the parent object of object 454.

Additionally or alternatively, the rendered instructions need not comprise the same programming language(s), scripting language(s), and/or data interchange format(s) as the original instructions intercepted in step 510. For example, the rendered instructions may comprise one or more other standard and/or proprietary languages, formats, and/or codes that are not included in the originally intercepted instructions: Dynamic HTML, XML, eXtensible Stylesheet Language, VBScript, Lua, YAML Ain't Markup Language ("YAML"), JavaScript Object Notation ("JSON"), shell script, Java, Ruby, Python, and/or Lisp.

Additionally or alternatively, the rendered instructions may reference the IP address and/or domain name of intermediary computer 230. For example, a link defined in the original instructions may include the IP address of original web server computer 302. Accordingly, forward translator may replace the IP address of original web server computer 302, with the address of intermediary computer 230. If a user selects the link through a user interface (for example through visitor browser 195), then a request may be sent to the IP address of intermediary computer 230 instead of the IP address of original web server computer 302.

Forward translator 336 may use configuration 232 to determine which method(s) to use to perform step 560 and/or step 570. Accordingly, one or more of the methods discussed herein, alone or in combination, may be a polymorphic protocol defined in configuration 232. Additionally or alternatively, configuration 232 may define which objects and/or types of objects may be modified based on one or more of the methods discussed herein. Additionally or alternatively, configuration 232 may define which objects and/or or types of objects need not be modified based on one or more of the methods discussed herein. Configuration 232 may be a database, a configuration file, and/or any other method of storing preferences. Configuration 232 may store more than one configuration for one or more web servers in web infrastructure 205. Intermediary computer 230 may select a configuration in configuration 232 based on any number of factors. For example, intermediary computer 230 may select a configuration in configuration 232 based on a domain associated with the server computer that the instructions were intercepted from. Additionally or alternatively, intermediary computer 230 may select a configuration in configuration 232 based on a random variable seeded by time. Additionally or alternatively, intermediary computer 230 may select a configuration in configuration 232 based on attributes and/or properties of visitor browser 295. For example, intermediary computer 230 may select a configuration based on what types of instructions visitor browser 295 is capable of interpreting and/or processing.

In step 580, the intermediary computer sends the rendered, second set of instructions to the remote client computer. For example, forward translator 336 sends the rendered instructions to protocol handler 338. Protocol handler 338 sends the rendered instructions to visitor browser 295, which was the originally intended recipient of the data intercepted in step 510.

4.2 Caching Rendered Instructions

Intermediary computer 230 may render different instructions each time it receives instructions from web infrastructure 205 and/or original web server computer 302, regardless of whether the intercepted instructions are the same as a previous set of instructions. However, rendering instructions may be processor and/or memory intensive and take a substantial amount of time. Accordingly, intermediary computer 230 may cache instructions rendered by intermediary computer 230 in data storage 240. In response to receiving the same instructions from web infrastructure 205 and/or original web server computer 302, intermediary computer 230 may send the rendered instructions already cached in data storage 240, instead of re-rendering the intercepted instructions. While intermediary computer 230 may reduce its processing load by sending cached, rendered instructions, bots may be updated based on the cached, rendered instructions. Accordingly, intermediary computer 230 may refresh the cached instructions periodically and/or in response to one or more conditions.

Figure 6:
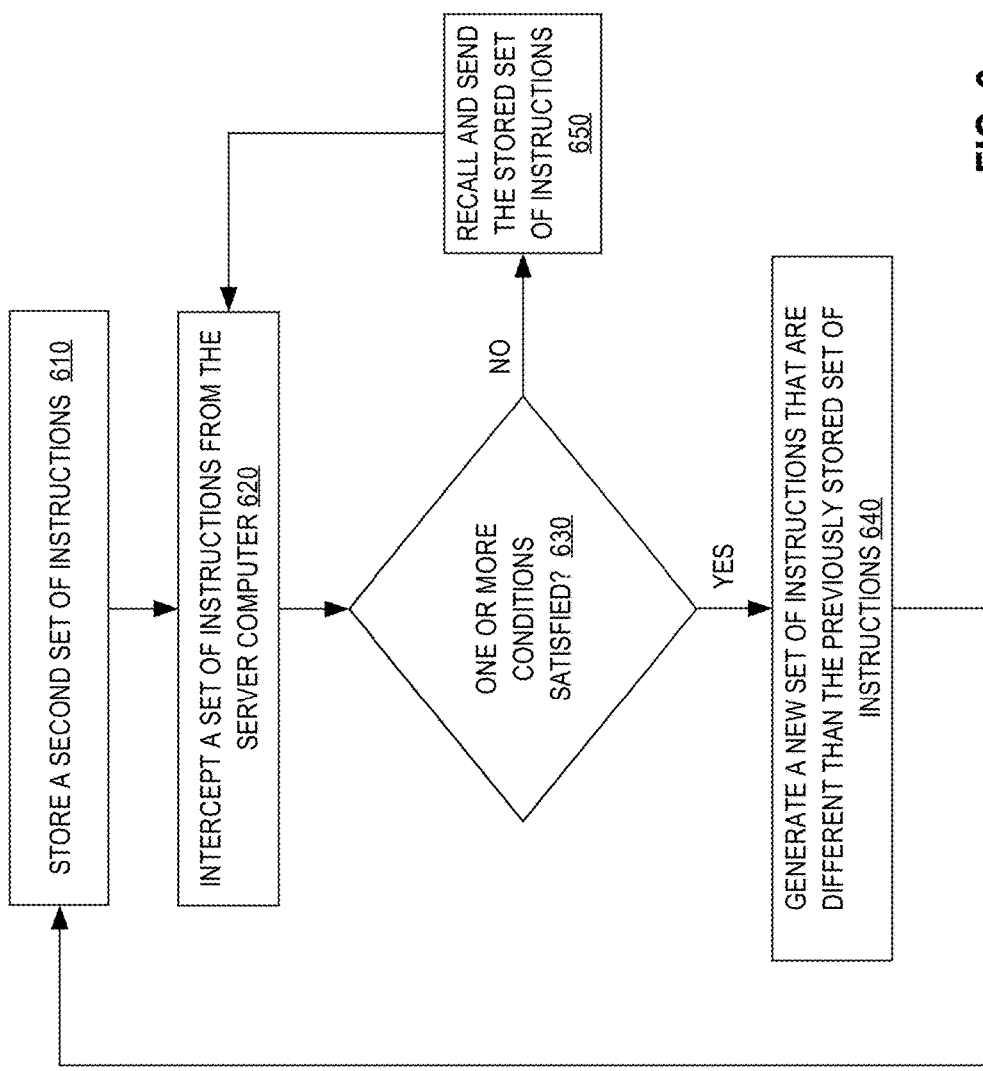
FIG. 6 illustrates a process for storing and refreshing rendered instructions in response receiving the same original instructions from a web server, in an example embodiment.

FIG. 6 illustrates a process for storing and refreshing rendered instructions in response receiving the same original instructions from a web server, in an example embodiment. For purposes of illustrating a clear example, FIG. 6 may be described with reference to FIG. 2 and FIG. 3, but using the particular arrangements illustrated in FIG. 2 and/or FIG. 3 is not required in other embodiments.

Turning now to step 610, in FIG. 6, subsequent to rendering a set of instructions in response to intercepting an original set of instructions, the intermediary computer may store the set of instructions. Additionally, the intermediary computer may store a timestamp. For example, forward translator 336 may store a set of rendered instructions and a timestamp in data storage 240. Additionally, intermediary computer 230, or a component of therein, may store a key associated with the stored, rendered set of instructions. The key may be based on the original set of instructions received. For example, the key may be based on a hashing algorithm using the original set of instructions as a parameter. Also for example, the original set of instructions may include the key.

In step 620, the intermediary computer intercepts a set of instructions from the server computer and determines that the cached, rendered set of instructions is based on the newly intercepted instructions. For example, browser backend 334 may generate a new key based on the newly intercepted instruction. Browser backend 334 may search the stored keys for a matching key. For purposes of illustrating a clear example, assume that browser backend 334 finds a matching key stored from step 610.

In step 630, the intermediary computer determines whether one or more conditions trigger a new set of instructions to be rendered. For example, the intermediary computer may determine that the time elapsed since the rendered instructions were stored is greater than a threshold amount. Browser backend 334 may compare a current timestamp, to the timestamp stored in data storage 240 in step 610. In response to determining that the elapsed time is greater than a threshold, control proceeds to step 640; otherwise, control proceeds to step 650. Additionally or alternatively, the intermediary computer may determine that a particular subset of the intercepted instructions changed. In response to determining that the particular subset of the instructions has changed, control may proceed to step 640; otherwise, control may proceed to step 650. The conditions under which intermediary computer 230 may render a new, different set of instructions may be stored in configuration 232.

In step 640, the intermediary computer generates a new set of instructions that is different than the set of instructions previously stored. For example, browser backend 334 and/or forward translator 336 performs step 520 through step 580 and renders a new, different set of instructions. Control then returns to step 610. For example, forward translator 336 may store the new set of rendered instructions and a current timestamp in data storage 240. Browser backend 334 and/or forward translator 336 may associate the stored key with the new stored set of rendered instructions. Forward translator 336 may, but need not, generate a new key.

In step 650, the intermediary computer recalls and sends the stored set of instructions to the intended client computer. For example, browser backend 334 may instruct forward translator 336 to send the previously stored set of rendered instructions to the intended client computer: visitor browser 295.

Figure 7:
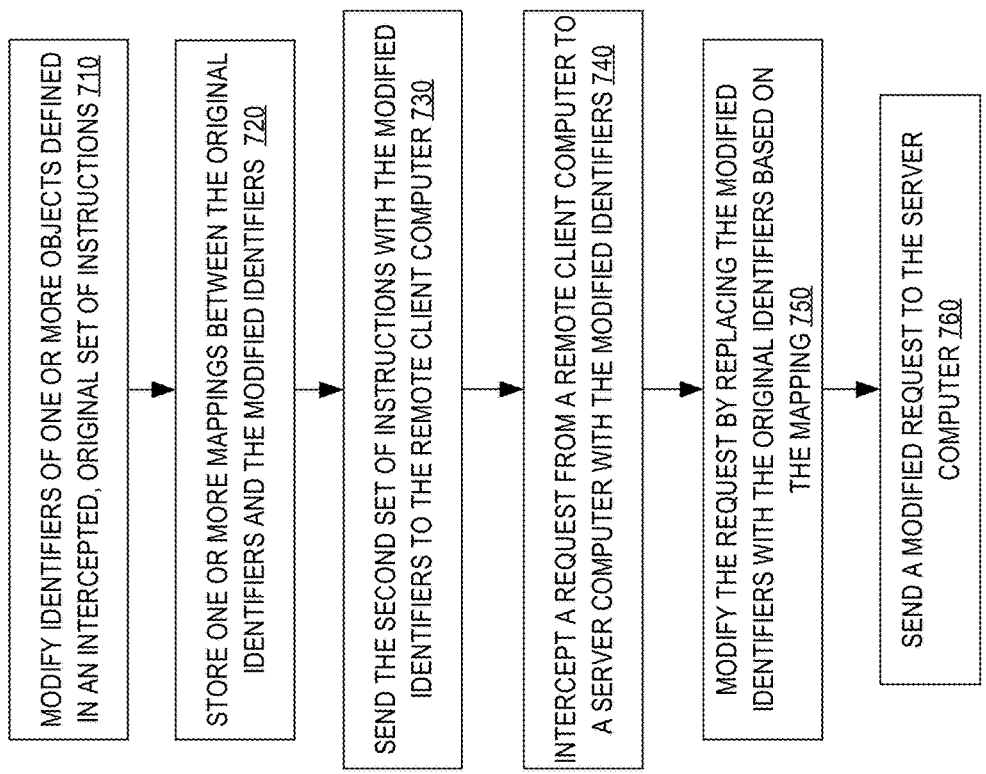
FIG. 7 illustrates a process for intercepting and modifying a request based on one or more stored attribute maps and/or DOM maps, in an example embodiment.

4.3 Intercept a Request from a Client Computer and Translate the Request into a New Request Based on a Stored Mapping Intermediary computer 230 may intercept and modify requests from a client computer based on one or more stored attribute maps and/or DOM maps. FIG. 7 illustrates a process for intercepting and modifying a request based on one or more stored attribute maps and/or DOM maps, in an example embodiment. For purposes of illustrating a clear example, FIG. 7 may be described with reference to FIG. 2 and/or FIG. 3, but using the particular arrangements illustrated in FIG. 2 and/or FIG. 3 are not required in other embodiments. Turning now to step 710, in FIG. 7, an intermediary computer modifies identifiers of one or more objects defined in an intercepted, original set of instructions. For purposes of illustrating a clear example, assume that intermediary computer 230 intercepted an original set of instructions from original web server computer 302 to be sent to visitor browser 195; browser backend 334 generated in-memory data structures 400 based on the original set of instructions; object 452 has an attribute that is a unique identifier: "452k"; and forward translator 336 translates an identifier of object 452 identifier to "ABC".

In step 720, the intermediary computer stores one or more mappings between the original identifiers and the modified identifiers. Additionally or alternatively, forward translator 336 may store a transaction identifier. Forward translator 336 may associate the transaction identifier with each mapping. The transaction identifier may be used to recall the mappings associated with the set of original instructions and/or a rendered set of instructions. The transaction identifier may be a modified identifier, such as the identifier of a form object in DOM 450. For purposes of illustrating a clear example, assume that forward translator 336 stores a mapping between "452" and "ABC", in transaction store 340 and/or data storage 240 and that forward translator 336 generates a transaction identifier, "T1", and associates the transaction identifier "T1" with the mapping between "452" and "ABC".

Accordingly, forward translator 336 may send the mapping between "452" and "ABC" and the transaction identifier, "T1", to transaction store 340. Additionally or alternatively, forward translator 336 and/or transaction store 340 may store the mapping and the transaction identifier in data storage 240.

In step 730, the intermediary computer sends the second set of instructions with the modified identifiers to the remote client computer. For purposes of illustrating a clear example, assume forward translator 336 renders a second set of instructions based on the current state of the data structures and the operations, using one or more of the methods discussed herein. Accordingly, forward translator 336 may send the rendered, second set of instructions to visitor browser 295 through protocol handler 338.

In step 740, the intermediary computer intercepts a request from a remote client computer to a server computer with the modified identifiers. For purposes of illustrating a clear example, assume the following: Visitor browser 295 receives the rendered, second set of instructions; visitor browser 295 executes the rendered, second set of instructions and generates the same objects in memory as were stored in in-memory data structures 400 to render the second set of instructions; visitor browser 295 generates a user interface based on the objects in memory; a user using visitor browser 295, enters data into a field with an identifier, ABC, and selects a "submit" button, through the user interface generated from the rendered, second set of instructions; and visitor browser 295 sends a request to original web server computer 302 with the identifier "ABC", data associated with "ABC", and the identifier "T1".

Accordingly, intermediary computer 230 may intercept the request. For example, protocol handler 338 may receive the request. Protocol handler 338 may send the request to transaction store 340.

Additionally or alternatively, if a request is received for which there is no stored attribute maps and/or DOM maps, then the intermediary computer 230 may determine that the request is not an authorized request to be sent to original web server computer 302. Accordingly, the intermediary computer may not forward the request to original web server computer 302 for which the request was intended. Additionally or alternatively, intermediary computer 230 may return an error code, such as HTTP error 500, to the client computer that made the request. Additionally or alternatively, intermediary computer 230 may return a success code, such as HTTP error 200, to the client computer that made the request.

In step 750, the intermediary computer modifies the request by replacing the modified identifiers with the original identifiers based on the mapping. For example, based on the identifier "T1", transaction store 340 may recall the mapping between "452" and "ABC". Transaction store 340 may send the request and the mapping between "452" and "ABC" to reverse translator 342. Reverse translator 342 may modify the request based on the mapping: reverse translator 342 may associate the data associated with identifier "ABC" in the request, with identifier "452" defined in the original set of instructions. Additionally or alternatively, reverse translator 342 may modify the request causing a response to the modified request from original web server computer 302 to be sent to and intercepted by intermediary computer 320, instead of visitor browser 295.

In step 760, the intermediary computer sends a modified request to the server computer. For example, reverse translator 342 may send the modified request to original web server computer 302 through protocol client 332. Original web server computer 302 may send a set of instructions in response to the received request to visitor browser 295, which in turn may be intercepted by intermediary computer 230.

4.4 Methods for an Http-Based System

Figure 8:
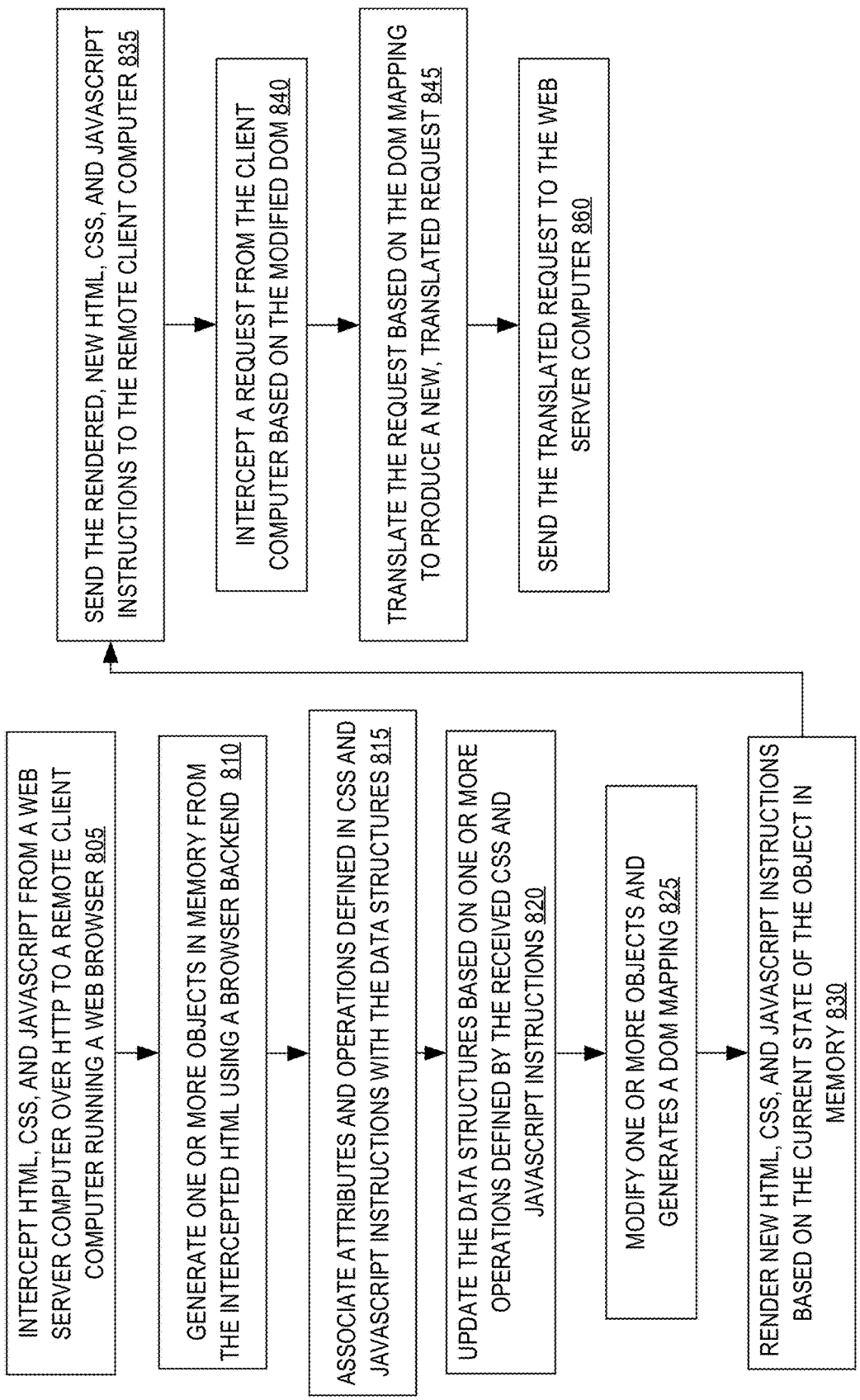
FIG. 8 illustrates a process for intercepting instructions and requests between a HyperText Transfer Protocol ("HTTP") server and an HTTP-based web browser over HTTP, in an example embodiment.

The processes and methods discussed herein may be used for any protocol(s) and/or type(s) of instructions. However, to illustrate a clear example of one or more of the methods discussed above, FIG. 8 illustrates a process for intercepting instructions and requests between an HTTP server and an HTTP-based web browser over HTTP, in an example embodiment. For purposes of illustrating a clear example, FIG. 8 may be described with reference to FIG. 2 and/or FIG. 3, but using the particular arrangements illustrated in FIG. 2 and/or FIG. 3 are not required in other embodiments. Turning now to step 805, in FIG. 8, an intermediary computer intercepts HTML, CSS, and JavaScript from a web server computer over HTTP to a remote client computer running a web browser. For purposes of illustrating a clear example, assume the following:

Original web server computer 302 hosts a website that sends and receives content through HTTP.

Visitor computer 299 is a remote client computer that executes visitor browser 295, which a web browser, that receives and processes HTML, CSS, and/or JavaScript instructions, and sends requests, over HTTP.

Visitor browser 295 generates a DOM maintained in memory on visitor computer 299, based on the received HTML, CSS, and/or JavaScript instructions.

Visitor browser causes a user interface to be displayed on a monitor connected to visitor computer 299 based on the DOM maintained in memory on visitor computer 299.

Intermediary computer 230 is an in-line computer between original web server computer 302 and visitor computer 299, such that all data sent and/or received between original web server computer 302 and visitor computer 299 is sent and/or received through intermediary computer 230.

Protocol client 332 is an HTTP protocol client.

Protocol handler 338 is an HTTP protocol handler.

In response to a request for data from a user, through visitor browser 295, original web server computer 302 sends a first set of instructions comprising HTML, CSS, and JavaScript instructions.

The HTML instructions comprise the following text: <form id="452"> <input type="text" id="454" name="454"/> </form>.

The CSS instructions comprise the following text: #452 {width: 52 px;}.

The JavaScript instructions comprise a first function that references the object with an identifier attribute of "454" and sets the value of the object to a key "12345".

The JavaScript instructions comprise an instruction that causes the first function to be executed after each of the objects defined in the HTML have been loaded, regardless of user interaction.

The JavaScript instructions comprise a second function that submits the value of the field identified as "454" to original web server computer 302.

Accordingly, intermediary computer 230, through protocol client 332 may receive the HTML, CSS, and JavaScript instructions intended to be sent to visitor computer 299. Protocol client 332 may send the HTML, CSS, and JavaScript instructions to browser backend 334.

In step 810, the intermediary computer generates one or more objects in memory from the intercepted HTML using a browser backend. For purposes of illustrating a clear example, assume browser backend 334 is a headless, HTTP, web browser backend that process HTML, CSS, and/or JavaScript instructions and generates objects in memory based on the HTML, CSS, and JavaScript instructions received. Accordingly, browser backend 334 may generate object 452, which represents a form with the identifier "452" in DOM 450 stored in in-memory data structures 400, from the received HTML instructions. Furthermore, browser backend 334 may generate object 454, which represents an input with the identifier "454" which is a child of object 452, in DOM 450, in-memory data structures 400 from the received HTML.

In step 815, the intermediary computer associates attributes and operations defined in CSS and JavaScript instructions with the data structures. For example, browser backend 334 may generate other property information 430, which comprises an attribute named "width", with a value "52 px". Browser backend 334 may associate the attribute named "width" with object 452. Also for example, browser backend 334 may generate JavaScript engine state info 440 which comprises a representation of the first operation and a representation of the second operation. Browser backend 334 may associate first operation and the second operation with object 454.

In step 820, the intermediary computer updates the data structures based on one or more operations defined by the received CSS and JavaScript instructions. For example, browser backend 334 may store the attribute named "width", and the attribute's value, in object 452. Also for example, browser backend 334 may perform the first operation represented in JavaScript engine state info 440. Accordingly, object 454 may include the value "12345". Since no instruction indicates that the second operation should be executed after the objects defined in the HTML are loaded, browser backend 334 need not perform the second operation.

Since the CSS attribute name "width" has already been integrated into the associated object, the attribute may be deleted from other property information 430. Similarly, since the first operation has already been performed, the representation of the first operation in JavaScript engine state info may be deleted. However, for purposes of illustrating a clear example, assume that attribute named "width" and the first operation have not been deleted.

In step 825, the intermediary computer modifies one or more objects and generates a DOM mapping. For example, forward translator 336 may modify the identifier for object 452 to "ABC" and the identifier for object 454 to "DEF" to produce a modified DOM. Accordingly, forward translator 336 may generate a mapping from the original DOM to the modified DOM to produce a DOM mapping, which includes two attribute mappings: "452" with "ABC", and "454" with "DEF".

Forward translator 336 may select the new identifier, "ABC", to be the transaction identifier for the DOM mapping. Forward translator 336 may select the identifier "ABC" because it is the identifier of a form; accordingly, forward translator 336 may associate all mappings of identifiers in the form with the transaction identifier "ABC": the mapping of "452" with "ABC" and/or the mapping of "454" with "DEF". Additionally or alternatively, forward translator may generate a transaction identifier for each form and/or link defined in the original and/or modified DOM. Each mapping may be associated with each transaction identifier. Additionally or alternatively, forward translator 336 may select an identifier for any other reason as the transaction identifier. Additionally or alternatively, forward translator 336 may generate a transaction identifier that is not based on any identifier. Forward translator 336 may store the DOM mapping in data storage 240 and/or transaction store 340.

In step 830, the intermediary computer renders new HTML, CSS, and JavaScript instructions based on the current state of the objects in memory. For purposes of illustrating a clear example, assume the following: The rendered HTML comprises the following text: <form id="ABC"> <input type="text" id="DEF" name="DEF" value="12345"/> </form>; the rendered CSS comprises the following text: #ABC {width: 52 px;}; the rendered JavaScript instructions comprise an operation that submits the value of the field identified as "DEF" to original web server computer 302.

In step 835, the intermediary computer sends the rendered, new HTML, CSS, and JavaScript instructions to the remote client computer. For example, forward translator 336 may send visitor browser 295 the new HTML, CSS, and JavaScript instructions rendered in step 830, through protocol handler 338, over HTTP. Upon executing the new HTML, CSS, and JavaScript instructions, visitor browser 295 may generate the same objects and/or operations in memory as existed in in-memory data structures 400 when the new instructions were rendered with the modified DOM.

In step 840, the intermediary computer intercepts a request from the remote client computer based on the modified DOM. For purposes of illustrating a clear example, assume the following: The user using visitor computer 299 input text into visitor browser 295, which was associated with object DEF in visitor computer's memory; the user using visitor computer 299 selected a submit button, which caused visitor browser to execute the operation defined by the rendered JavaScript instructions, which submits a request that includes the value of the field identified as "DEF", associated with the identifier "DEF"; the submitted request includes that associates the value of the field identified as "DEF" and/or the identifier "DEF" with identifier "ABC".

Accordingly, protocol handler 338 intercepts the request and sends the request to transaction store 340. Transaction store 340 may recall the DOM mapping associated with "ABC" from transaction store 340 and/or data storage 240. Transaction store 340 may send the DOM mapping and the request to reverse translator 342.

In step 845, the intermediary computer translates the request based on the DOM mapping to produce a new, translated request. For example, reverse translator 342 receives the request and the DOM mapping. Reverse translator 342 translates the request into a new request based on the original DOM, using the DOM mapping. Accordingly, the new request may include the value from the received request associated with the identifier "454", instead of identifier "DEF". Additionally, the new request may include data associating the value and/or the identifier "454" with the identifier "452". The new request may be the request visitor browser 295 would have sent in response to the same user input in step 840 had the original instructions, not the modified instructions, been sent to visitor browser 295.

In step 850, the intermediary computer sends the translated request to the web server computer. For example, reverse translator 342 sends the translated, new request to original web server computer 302 through protocol client 332. Accordingly, original web server computer 302 may respond to the new request and respond with HTML, CSS, and/or JavaScript instruction, at which point intermediary computer 230 may revisit step 805.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
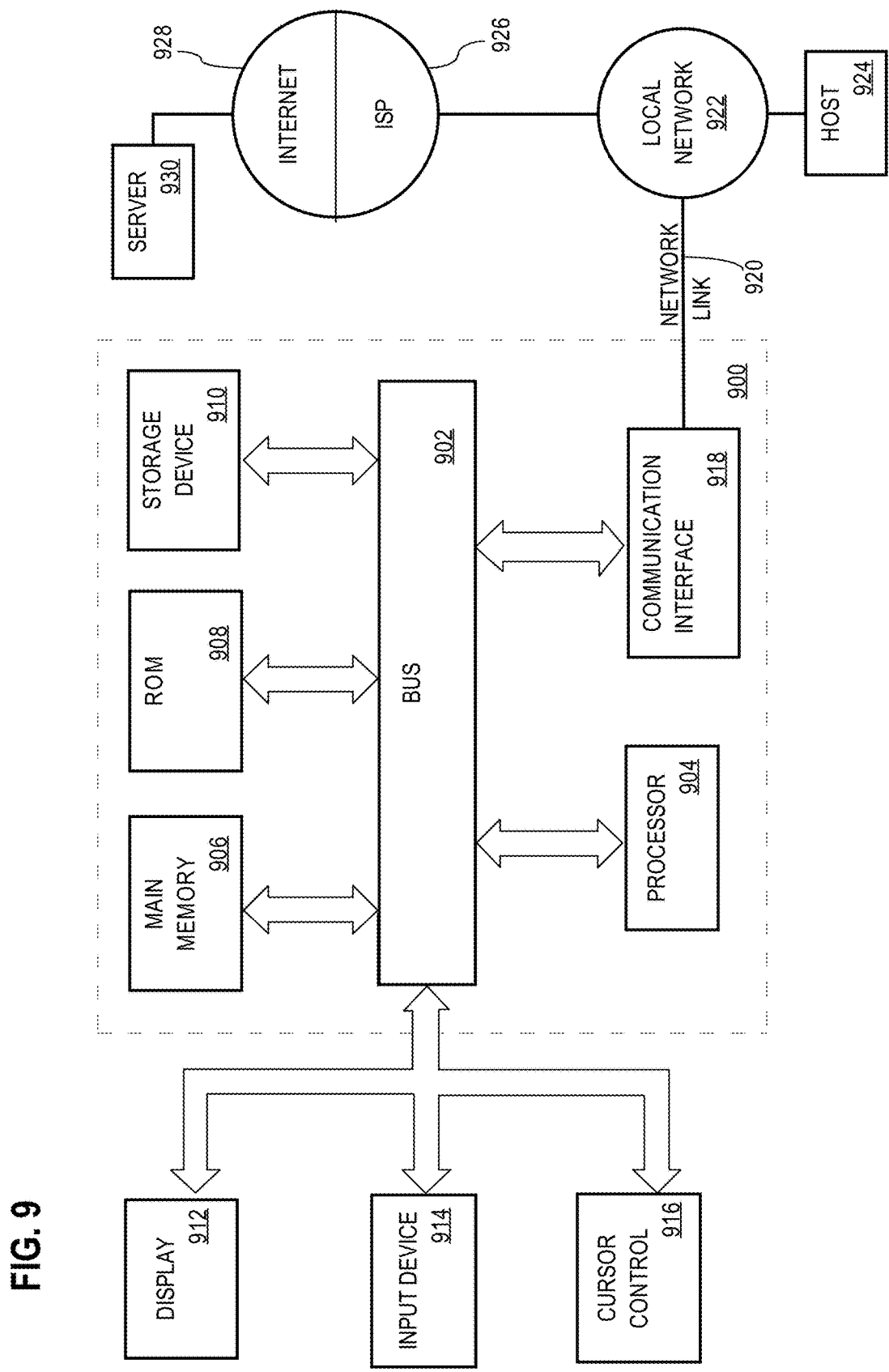
FIG. 9 illustrates a computer system upon which an embodiment may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

6.0 Other Aspects Of Disclosure

Using the networked computer arrangements, intermediary computer, and/or processing methods described herein, security in client-server data processing may be significantly increased. In particular, the use of browser programs becomes significantly more secure. Forward translating and reverse translating techniques herein effectively permit obfuscating data field and/or container identifiers and DOM modification for data that is financial, personal, or otherwise sensitive so that attackers cannot determine which fields and/or containers in a web page include the sensitive data.

Consequently, one or more various attacks, such as a denial of service ("DOS") attack, credential stuffing, fake account creation, ratings or results manipulation, man in the browser attacks, reserving rival goods or services, scanning for vulnerabilities, and/or exploitation of vulnerabilities, are frustrated because all fields and/or containers appear to the attacker to be gibberish, or at least cannot be identified as indicating credit card data, bank account numbers, personally identifying information, confidential data, sensitive data, proprietary data, and/or other data.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, from a first client computer, a first request for a first set of instructions, wherein the first set of instructions define one or more objects, and the one or more objects define a first object with a first identifier;
in response to the first request;
rendering a second set of instructions by assigning a second identifier to the first object, wherein the second set of instructions is different than the first set of instructions, and wherein the first identifier is different than the second identifier;
sending the second set of instructions to the first client computer;
receiving, from a second client computer, a second request for the first set of instructions;
in response to the second request:
rendering a third set of instructions by assigning a third identifier to the first object, wherein the third set of instructions is different than the first set of instructions and the second set of instructions, and wherein the third identifier is different than the first identifier and the second identifier;
sending the third set of instructions to the second client computer;
wherein the method is performed by one or more computing devices.

2. The method of claim 1 comprising:
storing a mapping between the second identifier and the first identifier;
receiving, from the first client computer, a third request that includes the second identifier;
determining the first identifier is associated with the second identifier included in the third request based on the mapping;
replacing the second identifier in the third request with the first identifier to produce a modified request.

3. The method of claim 1 comprising:
receiving, from a third client computer, a third request for the first set of instructions;
determining that a first amount of time has elapsed since sending the second set of instructions;
in response to determining that the first amount of time is less than a threshold amount of time, sending the second set of instructions to the third client computer;
receiving, from a fourth client computer, a fourth request for the first set of instructions;
determining that a second amount of time has elapsed since sending the second set of instructions;
in response to determining that the second amount of time is greater than the threshold amount of time:
rendering a fourth set of instructions by assigning a fourth identifier to the first object, wherein the fourth set of instructions is different than the first set of instructions, the second set of instructions, and the third set of instructions, and wherein the fourth identifier is different than the first identifier, the second identifier, and the third identifier;
sending the fourth set of instructions to the fourth client computer.

4. The method of claim 1, wherein the first set of instructions define an operation that includes the first identifier and references the first object by the first identifier, and the method comprises:
modifying the operation to produce a modified operation to include the second identifier;
rendering one or more instructions, which when executed by the first client computer performs the modified operation, wherein the one or more instructions are included in the second set of instructions.

5. The method of claim 1, wherein an object of the one or more objects has an index, the first set of instructions define an operation that references the object by the index, and the method comprises:
generating a data structure that corresponds to the object;
associating the operation with the data structure;
assigning an identifier to the data structure to produce a modified data structure;
determining that the operation is associated with the data structure;
in response to assigning the identifier to the data structure and determining that the operation is associated with the data structure, modifying the operation to produce a modified operation that refers to the modified data structure by the identifier;
rendering one or more instructions, which when executed by the first client computer generate the modified data structure and the modified operation, wherein the one or more instructions are included in the second set of instructions.

6. The method of claim 1, wherein an object of the one or more objects includes an attribute, and the method comprises:
generating a data structure that corresponds to the object that includes the attribute;
removing the attribute from the data structure to produce a modified data structure;
generating a new operation, which when performed adds the attribute to the modified data structure;
rendering one or more instructions, which when executed by the first client computer generates the modified data structure and subsequently performs the new operation, which adds the attribute to the modified data structure.

7. The method of claim 1, wherein the one or more objects are a plurality of objects, the first set of instructions comprises a document that defines the plurality of objects associated with each other in a first hierarchy, a plurality of data structures are associated with each other according to the first hierarchy, and the method comprises:
rendering a first document with instructions, which when executed by the first client computer cause the first client computer to generate the plurality of data structures associated with each other in a second hierarchy, wherein the second hierarchy is different than the first hierarchy;
rendering a second document with instructions, which when executed by the first client computer cause the first client computer to associate the plurality of data structures with each other according to the first hierarchy;
wherein the second set of instructions comprises the first document and the second document.

8. The method of claim 1, wherein the method comprises rendering the second set of instructions such that, in response to the first client computer executing the second set of instructions, the second set of instructions causes the first client computer to display a first user interface on a monitor that is visually identical to a second user interface that would have been caused to be displayed on the monitor in response to the first client computer executing the first set of instructions.

9. The method of claim 1, wherein the first set of instructions includes a first set of HyperText Markup Language ("HTML"), Cascading Style Sheets ("CSS"), and JavaScript codes, and the method comprises:
rendering, as at least part of the second set of instructions, a second set of HTML, CSS, and JavaScript codes, wherein the first set of HTML, CSS, and JavaScript codes are different than the second set of HTML, CSS, and JavaScript codes.

10. A method comprising:
receiving, from a first client computer, over HTTP, a first request for an original HyperText Markup Language ("HTML") document, a set of original Cascading Style Sheets ("CSS") codes, and a set of original JavaScript codes that define one or more objects in an original Document Object model ("DOM"), and the one or more objects define a first object with a first identifier;
in response to the first request:
rendering a modified HTML document, a set of modified CSS codes, and a set of modified JavaScript codes by assigning a second identifier to the first object;
wherein the modified HTML document defines a modified DOM that is different than the original DOM;
wherein the modified HTML document, the set of modified CSS codes, and the set of modified JavaScript codes are different than the original HTML document, the set of original CSS codes, and the set of original JavaScript codes;
wherein the first identifier is different than the second identifier;
generating a DOM mapping between the modified DOM and the original DOM;
storing the DOM mapping;
sending the modified HTML document, the set of modified CSS codes, and the set of modified JavaScript codes to the first client computer;
receiving, from the first client computer, a request based on the modified DOM;
translating the request based, at least in part, on the DOM mapping to produce a translated request based on the original DOM;
wherein the method is performed by one or more computing devices.

11. The method of claim 10, comprising modifying one or more data structures based on a polymorphic protocol to produce one or more updated data structures.

12. The method of claim 10, wherein the method comprises:
receiving, from a second client computer, a second request for the original HTML document, the set of original CSS codes, and the set of original JavaScript codes;
in response to the second request:
rendering a new modified HTML document, a set of new modified CSS codes, and a set of new modified JavaScript codes by assigning a third identifier to the first object;
wherein the new modified HTML document defines a new modified DOM that is different than the modified DOM and the original DOM;
wherein the new modified HTML document, the set of new modified CSS codes, and the set of new modified JavaScript codes are different than the modified HTML document, the set of modified CSS codes, and the set of modified JavaScript codes;
wherein the new modified HTML document, the set of new modified CSS codes, and the set of new modified JavaScript codes are different than the original HTML document, the set of original CSS codes, and the set of original JavaScript codes;
wherein the third identifier is different than the first identifier and the second identifier;
generating a new DOM mapping between the new modified DOM and the original DOM;
storing the new DOM mapping;
sending the new modified HTML document, the set of new modified CSS codes, and the set of new modified JavaScript codes to the second client computer;
receiving, from the second client computer, a new request based on the new modified DOM;
translating the new request based, at least in part, on the new DOM mapping to produce a new translated request based on the original DOM.

13. The method of claim 12 comprising:
receiving, from a remote client computer, a particular request that is not based on the new modified DOM;
rejecting the particular request in response to determining that the particular request is not based on the new modified DOM.

14. A system comprising:
a server computer configured to:
receive, from a first client computer, a first request for a first set of instructions, wherein the first set of instructions define one or more objects, and the one or more objects define a first object with a first identifier;
in response to the first request:
render a second set of instructions by assigning a second identifier to the first object, wherein the second set of instructions is different than the first set of instructions, and wherein the first identifier is different than the second identifier;
send the second set of instructions to the first client computer; receive, from a second client computer, a second request for the first set of instructions; in response to the second request:
render a third set of instructions by assigning a third identifier to the first object, wherein the third set of instructions is different than the first set of instructions and the second set of instructions, and wherein the third identifier is different than the first identifier and the second identifier;
sending the third set of instructions to the second client computer.

15. The system of claim 14, wherein the server computer is further configured to:
store a mapping between the second identifier and the first identifier;
receive, from the first client computer, a third request that includes the second identifier;
determine the first identifier is associated with the second identifier included in the third request based on the mapping;
replace the second identifier in the third request with the first identifier to produce a modified request.

16. The system of claim 14, wherein the server computer is further configured to:
receive, from a third client computer, a third request for the first set of instructions;
determine that a first amount of time has elapsed since sending the second set of instructions;
in response to determining that the first amount of time is less than a threshold amount of time, send the second set of instructions to the third client computer;
receive, from a fourth client computer, a fourth request for the first set of instructions;
determine that a second amount of time has elapsed since sending the second set of instructions;
in response to determining that the second amount of time is greater than the threshold amount of time:
render a fourth set of instructions by assigning a fourth identifier to the first object, wherein the fourth set of instructions is different than the first set of instructions, the second set of instructions, and the third set of instructions, and wherein the fourth identifier is different than the first identifier, the second identifier, and the third identifier;
send the fourth set of instructions to the fourth client computer.

17. The system of claim 14, wherein:
the first set of instructions define an operation that includes the first identifier and references the first object by the first identifier;
the server computer is configured to: modify the operation to produce a modified operation to include the second identifier;
render one or more instructions, which when executed by the first client computer performs the modified operation, wherein the one or more instructions are included in the second set of instructions.

18. The system of claim 14, wherein:
an object of the one or more objects has an index, the first set of instructions define an operation that references the object by the index;
the server computer is configured to:
generate a data structure that corresponds to the object;
associate the operation with the data structure;
assign an identifier to the data structure to produce a modified data structure;
determine that the operation is associated with the data structure;
in response to assigning the identifier to the data structure and determining that the operation is associated with the data structure, modify the operation to produce a modified operation that refers to the modified data structure by the identifier;
render one or more instructions, which when executed by the first client computer generate the modified data structure and the modified operation, wherein the one or more instructions are included in the second set of instructions.

19. The system of claim 14, wherein:
an object of the one or more objects includes an attribute;
the server computer is configured to:
generate a data structure that corresponds to the object that includes the attribute;
remove the attribute from the data structure to produce a modified data structure;
generate a new operation, which when performed adds the attribute to the modified data structure;
render one or more instructions, which when executed by the first client computer generates the modified data structure and subsequently performs the new operation, which adds the attribute to the modified data structure.

20. The system of claim 14, wherein:
the one or more objects are a plurality of objects, the first set of instructions comprises a document that defines the plurality of objects associated with each other in a first hierarchy, a plurality of data structures are associated with each other according to the first hierarchy;
the server computer is configured to:
render a first document with instructions, which when executed by the first client computer cause the first client computer to generate the plurality of data structures associated with each other in a second hierarchy, wherein the second hierarchy is different than the first hierarchy;
render a second document with instructions, which when executed by the first client computer cause the first client computer to associate the plurality of data structures with each other according to the first hierarchy;
wherein the second set of instructions comprises the first document and the second document.

21. The system of claim 14, wherein the server computer is configured to render the second set of instructions such that, in response to the first client computer executing the second set of instructions, the second set of instructions causes the first client computer to display a first user interface on a monitor that is visually identical to a second user interface that would have been caused to be displayed on the monitor in response to the first client computer executing the first set of instructions.

22. The system of claim 14, wherein:
the server computer is a web server computer;
the first set of instructions includes a first set of HyperText Markup Language ("HTML"), Cascading Style Sheets ("CSS"), and JavaScript codes;
the server computer is configured to render as at least part of the second set of instructions, a second set of HTML, CSS, and JavaScript codes, wherein the first set of HTML, CSS, and JavaScript codes are different than the second set of HTML, CSS, and JavaScript codes.

23. A system comprising:
a web server computer configured to:
receive, from a first client computer, over HTTP, a first request for an original HyperText Markup Language ("HTML") document, a set of original Cascading Style Sheets ("CSS") codes, and a set of original JavaScript codes that define one or more objects in an original Document Object Model ("DOM"), and the one or more objects define a first object with a first identifier;
in response to the first request:
render a modified HTML document, a set of modified CSS codes, and a set of modified JavaScript codes by assigning a second identifier to the first object;
wherein the modified HTML document defines a modified DOM that is different than the original DOM;

wherein the modified HTML document, the set of modified CSS codes, and the set of modified JavaScript codes are different than the original HTML document, the set of original CSS codes, and the set of original JavaScript codes;

wherein the first identifier is different than the second identifier;

generate a DOM mapping between the modified DOM and the original DOM;

send the modified HTML document, the set of modified CSS codes, and the set of modified JavaScript codes to the first client computer;

receive, from the first client computer, a request based on the modified DOM;

translate the request based, at least in part, on the DOM mapping to produce a translated request based on the original DOM.

24. The system of claim 23, wherein the web server computer is configured to modify one or more data structures based on a polymorphic protocol to produce one or more updated data structures.

25. The system of claim 23, wherein:

the web server computer is configured to:

receive, from a second client computer, a second request for the original HTML document, the set of original CSS codes, and the set of original JavaScript codes;

in response to the second request:

render a new modified HTML document, a set of new modified CSS codes, and a set of new modified JavaScript codes by assigning a third identifier to the first object;

wherein the new modified HTML document defines a new modified DOM that is different than the modified DOM and the original DOM;

wherein the new modified HTML document, the set of new modified CSS codes, and the set of new modified JavaScript codes are different than the modified HTML document, the set of modified CSS codes, and the set of modified JavaScript codes;

wherein the new modified HTML document, the set of new modified CSS codes, and the set of new modified JavaScript codes are different than the original HTML document, the set of original CSS codes, and the set of original JavaScript codes;

wherein the third identifier is different than the first identifier and the second identifier;

generate a new DOM mapping between the new modified DOM and the original DOM;

send the new modified HTML document, the set of new modified CSS codes, and the set of new modified JavaScript codes to the second client computer;

store the new DOM mapping;

receive, from the second client computer, a new request based on the new modified DOM;

translate the new request based, at least in part, on the new DOM mapping to produce a new translated request based on the original DOM.

26. The system of claim 25, wherein the web server computer is configured to:

receive, from a remote client computer, a particular request that is not based on the new modified DOM;

reject the particular request in response to determining that the particular request is not based on the new modified DOM.

* * * * *